US010104267B1

(12) United States Patent
Sakayama

(10) Patent No.: US 10,104,267 B1
(45) Date of Patent: Oct. 16, 2018

(54) INFORMATION PROCESSING APPARATUS AND NON-TRANSITORY COMPUTER READABLE STORAGE MEDIUM INCLUDING PRIORITY-BASED WIRELESS COMMUNICATION SWITCHING

(71) Applicant: FUJI XEROX CO., LTD., Tokyo (JP)

(72) Inventor: Takashi Sakayama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/790,417

(22) Filed: Oct. 23, 2017

(30) Foreign Application Priority Data

Mar. 28, 2017 (JP) ................................ 2017-063577

(51) Int. Cl.

| | |
|---|---|
| ***G06F 3/12*** | (2006.01) |
| ***H04N 1/333*** | (2006.01) |
| ***H04W 72/10*** | (2009.01) |
| ***H04N 1/32*** | (2006.01) |
| ***H04N 1/00*** | (2006.01) |
| ***H04N 1/327*** | (2006.01) |
| *H04W 88/06* | (2009.01) |

(52) U.S. Cl.
CPC ..... *H04N 1/33323* (2013.01); *H04N 1/00307* (2013.01); *H04N 1/32518* (2013.01); *H04N 1/32797* (2013.01); *H04W 72/10* (2013.01); *H04N 2201/0094* (2013.01); *H04N 2201/3335* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 6,393,031 B1 | 5/2002 | Isomura | | |
| 2009/0111510 A1 | 4/2009 | Ono | | |
| 2015/0116768 A1* | 4/2015 | Kitao | .................... | G06F 3/1236 358/1.15 |
| 2015/0237560 A1* | 8/2015 | Saida | .................. | H04W 36/365 370/331 |

FOREIGN PATENT DOCUMENTS

| | | |
|---|---|---|
| JP | H11-252662 A | 9/1999 |
| JP | 2009-303107 A | 12/2009 |
| JP | 4716144 B2 | 7/2011 |

* cited by examiner

*Primary Examiner* — Andrew H Lam
(74) *Attorney, Agent, or Firm* — Oliff PLC

(57) ABSTRACT

An information processing apparatus includes plural communication units, a switching unit, and a controller. The plural communication units are configured to conduct a wireless communication at different communication speeds. If a communication is attempted to be started, the switching unit compares a priority of a user who is conducting a communication with a priority of a user who is attempting to start the communication, to switch a communication unit so that the user having a higher priority uses a communication unit having a faster communication speed. The controller is configured to perform a control to start the communication using the communication unit switched by the switching unit.

6 Claims, 21 Drawing Sheets

| USER ID (610) | USER NAME (620) | PRIORITY (630) |
| --- | --- | --- |
| | | |

INFORMATION PROCESSING APPARATUS AND NON-TRANSITORY COMPUTER READABLE STORAGE MEDIUM INCLUDING PRIORITY-BASED WIRELESS COMMUNICATION SWITCHING

CROSS-REFERENCE TO RELATED APPLICATIONS

This application is based on and claims priority under 35 USC 119 from Japanese Patent Application No. 2017-063577 filed Mar. 28, 2017.

BACKGROUND

Technical Field

The present invention relates to an information processing apparatus and a non-transitory computer readable storage medium.

SUMMARY

According to an aspect of the invention, an information processing apparatus includes plural communication units, a switching unit, and a controller. The plural communication units are configured to conduct a wireless communication at different communication speeds. If a communication is attempted to be started, the switching unit compares a priority of a user who is conducting a communication with a priority of a user who is attempting to start the communication, to switch a communication unit so that the user having a higher priority uses a communication unit having a faster communication speed. The controller is configured to perform a control to start the communication using the communication unit switched by the switching unit.

BRIEF DESCRIPTION OF THE DRAWINGS

Exemplary embodiments of the present invention will be described in detail based on the following figures, wherein:

FIG. 6 is an explanatory view illustrating an exemplary data structure of a user information table;

DETAILED DESCRIPTION

First, prior to describing the present exemplary embodiment, premises of the present exemplary embodiment or an information processing apparatus using the present exemplary embodiment will be described. It should be noted that the descriptions are intended to facilitate understandings of the present exemplary embodiment.

In the related art, a smart phone or the like is equipped with multiple different communication units and selects a communication unit to be connected based on a specific priority or the like to conduct a communication.

In the technologies described in Japanese Patent No. 4716144 (corresponding to US 2009/0111510 A1), JP-A-11-252662 (corresponding to U.S. Pat. No. 6,393,031), and JP-A-2009-303107, when a communication is conducted (or prior to starting a communication), an optimum communication unit is selected and then the communication is conducted.

However, while one of the multiple communication units is selected and then the communication is conducted, the overall optimization may not be achieved due to later circumferences of the other communication units. For example, assuming that after a communication by a communication unit having a fast communication speed is started in response to a communication request from a certain user A, a communication request is received from another user B (for example, a superior of the user A) who needs a communication speed. Even in this case, a communication unit having a slow communication speed is used, and as a result, it would take a time to conduct the later communication of the user B.

According to the present exemplary embodiment, the communication unit used in the earlier communication that has already been being conducted is switched in this case so that a suitable communication unit having a fast communication speed is allocated to the user B who has made the communication request later.

Hereinafter, an exemplary embodiment suitable for implementing the present invention will be described with reference to the accompanying drawings.

Figure 1:
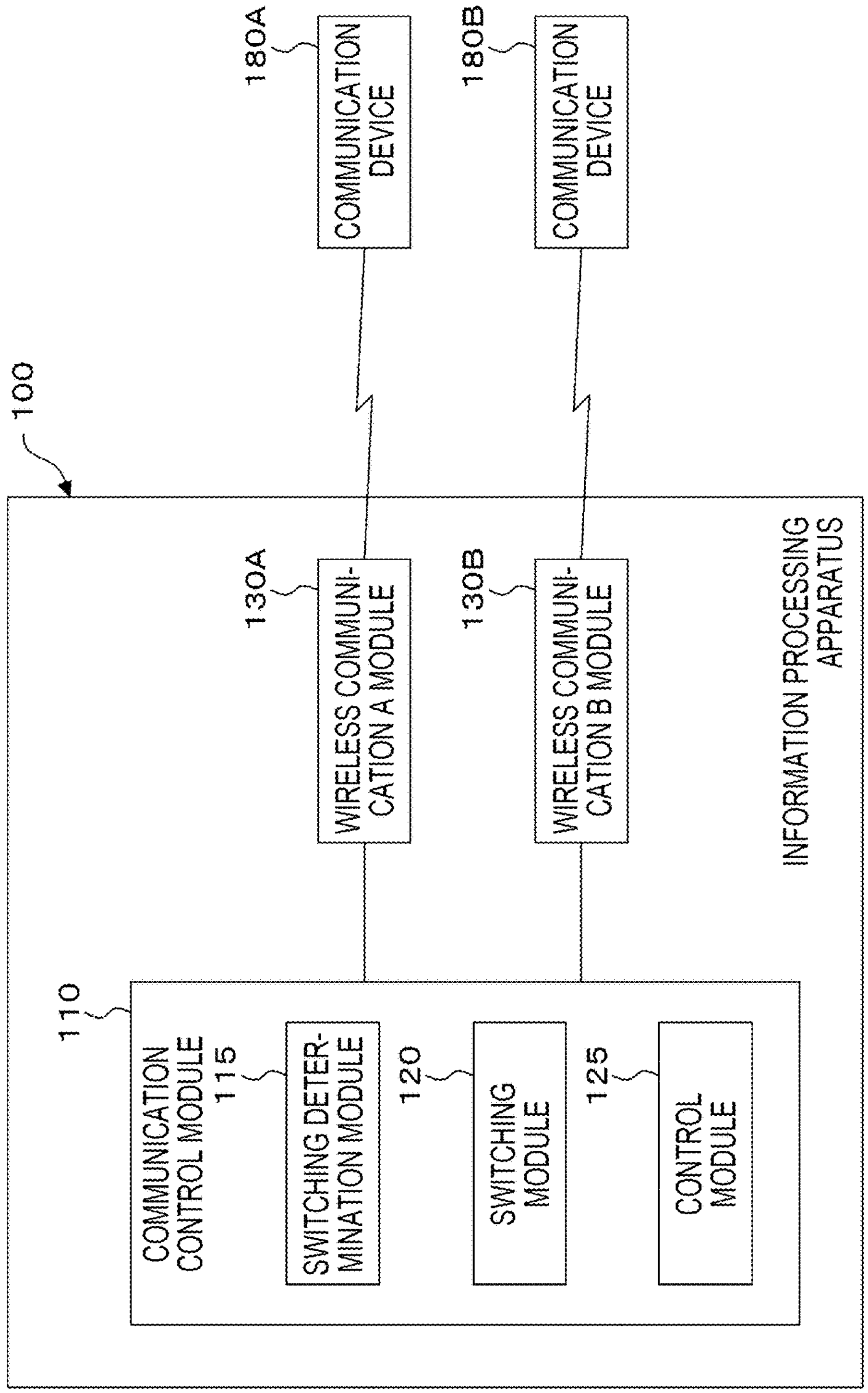
FIG. 1 is a view illustrating a conceptual module configuration relating to an exemplary configuration of an exemplary embodiment.

FIG. 1 is a view illustrating a conceptual module configuration relating to an exemplary configuration of the present exemplary embodiment.

A module, in general, indicates a logically separable component such as software (computer program) or hardware. Accordingly, a module in the present exemplary embodiment indicates not only a module in a computer program but also a module in a hardware configuration. Thus, the descriptions of the present exemplary embodiment also include descriptions of a computer program to serve as a module (a program that causes a computer to execute respective processes, a program that causes a computer to serve as respective units, and a program that causes a computer to implement respective functions), a system, and a method. For convenience of descriptions, the expressions "store," "caused to store," and equivalent expressions thereto will be used. If an exemplary embodiment is directed to a computer program, the expressions indicate storing data or the like in a memory device or performing a control to cause data or the like to be stored in a memory device. In addition, one module may correspond to one function. In implementation, however, one module may be configured with one program, multiple modules may be configured with one program, and in reverse, one module may be configured with multiple programs. Further, multiple modules may be executed by one computer, or one module may be executed by multiple computers in a distributed or parallel environment. In addition, one module may include another module. Hereinafter, the term "connection" is also used for a logical connection (for example, data exchange, instructions, and a reference relationship among data), in addition to a physical connection. The term "predetermined" refers to being determined prior to a target process. The term "predetermined" includes the meaning of being determined according to a circumstance/state at or until a specific time point not only before a process by the present exemplary embodiment is started, but also prior to a target process even after a process by the present exemplary embodiment is started. If multiple "predetermined values" exist, the values may be different from each other, or two or more of the values (or all values, of course) may be identical to each other. In addition, the description "when it is A, B is performed" indicates that "it is determined whether it is A, and if it is determined that it is A, B is performed," except for a case where it is unnecessary to make the determination as to whether it is A. If items are enumerated like "A, B, and C," the enumeration is merely exemplary and includes a case of selecting only one (for example, only A) of the items, unless otherwise specified.

In addition, a system or device includes a system or device which is implemented with one computer, hardware component, device or the like, in addition to a system or device configured such that multiple computers, hardware components, devices and the like are connected to each other by a communication unit such as a network (including a one-to-one corresponding communication connection). The terms "device" and "system" are synonymous with each other. Of course, the "system" does not include a system merely meaning a social "structure" (social system) which is an artificial engagement.

In addition, target information is read from a memory device per process by each module or for each of multiple processes which are executed in a module. After the process is executed, the process result is stored in the memory device. Accordingly, descriptions of reading from the memory device prior to the process and storing in the memory device after the process may be omitted. Examples of the memory device may include a hard disk, a random access memory (RAM), an external memory medium, a memory device through a communication line, a register within a central processing unit (CPU), and the like.

An information processing apparatus 100 of the present exemplary embodiment conducts a wireless communication with a communication device 180. The information processing apparatus 100 includes a communication control module 110, a wireless communication A module 130A, and a wireless communication B module 130B as illustrated in the example of FIG. 1. The number of the wireless communication modules 130 may be three or more.

A communication device 180A is connected to the wireless communication A module 130A of the information processing apparatus 100 via a communication line. The communication device 180A is capable of conducting a wireless communication with the wireless communication A module 130A by a certain transmission method and channel.

A communication device 180B is connected to the wireless communication B module 130B of the information processing apparatus 100 via a communication line. The communication device 180B is capable of conducting a wireless communication with the wireless communication B module 130B by a certain transmission method and channel.

The communication device 180 is, for example, a portable information communication device (including a mobile phone, a smart phone, a mobile device, a wearable computer, and the like), a laptop PC or an access point. There may be provided multiple communication devices 180 that are capable of conducting a wireless communication with the information processing apparatus 100.

Each communication device 180 may conduct a wireless communication by multiple transmission methods and multiple channels.

The communication device 180 requests the information processing apparatus 100 to provide a service, through the wireless communication. Here, the "service" refers to a function or an operation provided by conducting the communication and is also called a job. For example, examples of the service include a printing process service for making a printing instruction and an image reading service for receiving an image reading result, with respect to an image processing apparatus 200 including the information processing apparatus 100.

The wireless communication A module 130A is connected to the communication control module 110 and also connected to the communication device 180A via the communication line. The wireless communication A module 130A is capable of conducting the wireless communication with the communication device 180A by the certain transmission method and channel. For example, the communication speed of the wireless communication A module 130A is different from the communication speed of the wireless communication B module 130B. In the following descriptions, for example, it is assumed that the communication speed of the wireless communication A module 130A is faster than the communication speed of the wireless communication B module 130B.

The wireless communication B module 130B is connected to the communication control module 110 and also connected to the communication device 180B via the communication line. The wireless communication B module 130B is capable of conducting the wireless communication with the communication device 180B by the certain transmission method and channel. For example, the communication speed of the wireless communication B module 130B is different from the communication speed of the wireless communication A module 130A. In the following descriptions, for example, it is assumed that the communication speed of the wireless communication B module 130B is slower than the communication speed of the wireless communication A module 130A.

In addition, each wireless communication module 130 may be capable of conducting a wireless communication by multiple transmission methods and multiple channels. The multiple transmission methods may include, for example, IEEE802.11a, IEEE802.11b, IEEE802.11c, IEEE802.11g, IEEE802.11n, IEEE802.11ac, IEEE802.11j, IEEE802.11ad, and Bluetooth (registered trademark).

In addition, at least one of the transmission methods of the wireless communication module 130 may have multiple channels (wireless communication paths). Of course, each of all the transmission methods may have multiple channels.

In addition, the transmission methods by which the wireless communication module 130 is capable of conducting a wireless communication may include at least IEEE802.11ad.

The communication control module 110 includes a switching determination module 115, a switching module 120, and a control module 125. The communication control module 110 is connected to the wireless communication A module 130A and the wireless communication B module 130B. The communication control module 110 controls the wireless communication between the information processing apparatus 100 and the communication device 180.

If a communication Y is attempted to be started and if a communication X has been being conducted, the switching determination module 115 determines whether to use the wireless communication module 130 (either of the wireless communication A module 130A or the wireless communication B module 130B) that is being used in the communication X, for the communication Y. It is assumed that the communications X and Y are wireless communications having different communication speeds. Specifically, the communications X and Y have different transmission methods or channels.

For example, if the communication Y is attempted to be started, the switching determination module 115 may determine whether to switch the wireless communication module 130, by comparing the priority (including "priority level") of a user A who is conducting a communication with the priority of a user B who is attempting to start the communication. Here, "switch the wireless communication module 130 (switching of the wireless communication module 130)" refers to switching the wireless communication A module 130A (the communication speed of the wireless communication A module 130A is faster than that of the wireless communication B module 130B) that is being used in the communication X, to the wireless communication B module 130B (the communication speed of the wireless communication B module 130B is slower than that of the wireless communication A module 130A) or changing the number of channels. As a result, the wireless communication A module 130A is used for the communication Y.

In addition to the condition of the priority of a user, the switching determination module 115 may determine whether to perform the switching, by comparing the priority of a service A that is conducting a communication with the priority of a service B that is attempting to start the communication Y.

Specifically, if the priority of the user B of the communication Y is higher than the priority of the user A of the communication X and if the priority of the service B that is attempting to start the communication Y is higher than the priority of the service A that is conducting a communication, the switching determination module 115 may determine to perform the switching. In addition, the priority of the printing process service may be set to be higher than the priority of the image reading service.

In addition to the condition of the priority of a user, for example, the switching determination module 115 may determine whether to perform the switching, by comparing a remaining data amount or remaining communication time of the service A that is conducting a communication using the communication X with a data amount or communication time of the service B that is attempting to start the communication Y.

In addition, if an interruption instruction to interrupt the communication that is being conducted is made, the switching determination module 115 may determine whether to switch the wireless communication module 130.

In addition, if an interruption instruction to interrupt the communication that is being conducted is made, the switching determination module 115 may determine whether to switch the wireless communication module 130, by comparing the priorities of the users.

If the communication Y is attempted to be started and if the wireless communication A module 130A having the communication speed faster than that of the wireless communication B module 130B has already been being used in the communication X, the switching module 120 switches the wireless communication A module 130A that is being used in the communication X to the wireless communication B module 130B having the slow communication speed. Specifically, this example corresponds to a case where the communication X has already been being conducted with the communication device 180A using the wireless communication A module 130A (prior to the start of the communication Y), and during this communication, a communication request is made from the communication device 180B. In this case, the communication X with the communication device 180A is switched from the wireless communication A module 130A to the wireless communication B module 130B. As a result of the switching, the communication X with the communication device 180A is conducted by the wireless communication B module 130B.

Then, the control module 125 performs a control to start the communication Y by the wireless communication A module 130A. That is, the communication Y with the communication device 180B is conducted by the wireless communication A module 130A.

For example, if a communication is attempted to be started, the switching module 120 compares the priority of the user A who is conducting a communication with the priority of the user B who is attempting to start a communication, to switch the wireless communication module 130 so that a user having a higher priority uses the wireless communication module 130 having a faster communication speed.

In addition to the condition of the priority of a user, the switching module 120 may compare the priority of the service A that is conducting a communication using the communication X with the priority of the service B that is attempting to start the communication Y, to switch the communication.

Here, the priority of the printing process service may be set to be higher than that of the image reading service. In this case, if the priority of the service B that is attempting to start the communication is higher than the priority of the service A that is conducting the communication, the switching module 120 may switch the communication.

Further, in addition to the condition of the priority of a user, the switching module 120 may compare the remaining data amount or remaining communication time of the service A that is conducting a communication with the data amount or communication time of the service B that is attempting to start a communication, to switch the communication.

In addition, if the service A that is conducting the communication uses multiple channels, the switching module 120 may perform the switching of the communication by reducing the number of channels that the service A being conducting the communication uses and allocating the reduced channels to the service B that is attempting to start a communication. The channels will be described later using the example of FIGS. 4A and 4B.

In addition, if an interruption instruction to interrupt the communication that is being conducted is made, the switching module 120 may switch the wireless communication module 130. That is, it is determined whether the instruction to interrupt the communication Y is made. If it is determined that the interruption instruction is made, the wireless communication module 130 having a fast communication speed is allocated to the communication Y which the instruction to interrupt is made.

In addition, if an instruction to interrupt the communication that is being conducted is made, the switching module 120 may compare the priorities of the users to switch the wireless communication module 130. That is, if the instruction to interrupt the later communication Y is made and if the priority of the user B who has instructed the communication Y is higher than the priority of the user A who is conducting a communication, the wireless communication module 130 having a fast communication speed is allocated to the communication Y.

Figure 2:
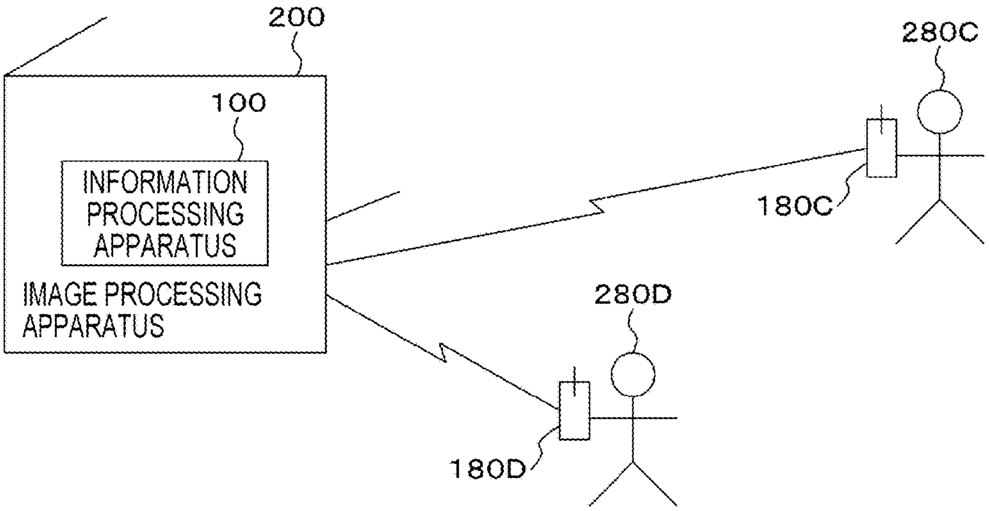
FIG. 2 is an explanatory view illustrating an exemplary system configuration using the exemplary embodiment.

FIG. 2 is an explanatory view illustrating an exemplary system configuration using the present exemplary embodiment.

The image processing apparatus 200 includes the information processing apparatus 100. The image processing apparatus 200, a communication device 180C of a user 280C, and a communication device 180D of a user 280D are connected to each other via communication lines. Especially, the image processing apparatus 200 is machine that is installed in an office or the like and used by multiple users. The image processing apparatus 200 may be used through the multiple communication devices 180 simultaneously. The image processing apparatus 200 is, for example, a copier, a facsimile, a scanner, a printer, or a multifunctional machine (an image processing apparatus having two or more functions of a scanner, a printer, a copier, a facsimile, and the like).

In the image processing apparatus 200, an optimal wireless communication module 130 (for example, the wireless communication module 130A) is selected from the multiple wireless communication modules 130. Even if the selected wireless communication module 130 is being used in another service (another job), the wireless communication module 130 that is conducting a communication (for example, the wireless communication module 130A) is switched to another wireless communication module (for example, the wireless communication module 130B), so that the communication may be conducted by the optimal wireless communication module 130 (for example, the wireless communication module 130A).

Specific examples will be described.

The user 280C is attempting to perform a process of transmitting a scanned image to the communication device 180C and storing the image in the communication device 180C (image reading service), by performing a scanning operation with the image processing apparatus 200. That is, the image processing apparatus 200 and the communication device 180C are communicating with each other.

Thereafter, the user 280D who is the superior of the user 280C (the priority of the user 280D is higher than the priority of the user 280C) transmits a printing instruction to the image processing apparatus 200 by operating the communication device 180D. In this case, the switching process is performed.

For example, if a wireless communication has already been being conducted with the communication device 180C using the transmission method of IEEE802.11ad, in order to conduct a communication with the communication device 180D, the wireless communication with the communication device 180C is switched to the wireless communication using the transmission method of IEEE802.11n through the above-described switching, and a wireless communication is conducted with the communication device 180D using the transmission method of IEEE802.11ad.

Figure 3:
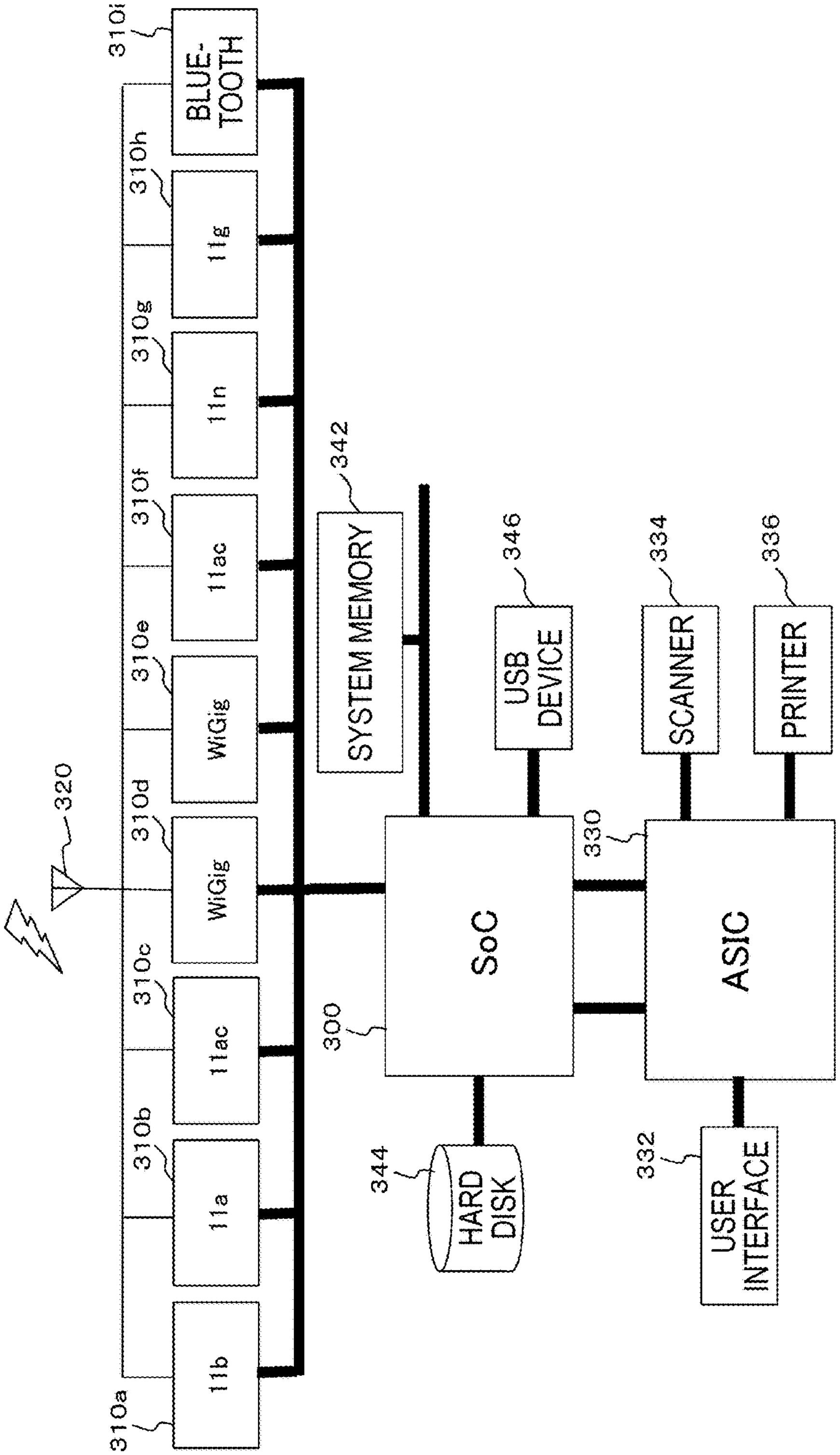
FIG. 3 is an explanatory view illustrating a specific exemplary configuration of the exemplary embodiment.

FIG. 3 is an explanatory view illustrating a specific exemplary configuration of the present exemplary embodiment (the image processing apparatus 200). The image processing apparatus 200 includes a system on a chip (SoC) 300, 11*b*:310*a*, 11*a*:310*b*, 11*ac*:310*c*, WiGig:310*d*, WiGig:310*e*, 11*ac*:310*f*, 11*n*:310*g*, 11*g*:310*h*, Bluetooth 310*i*, an antenna 320, a system memory 342, a hard disk 344, a USB device 346, an application specific integrated circuit (ASIC) 330, a user interface 332, a scanner 334, and a printer 336.

11*b*:310*a* is connected to the antenna 320 and the SoC 300. 11*a*:310*b* is connected to the antenna 320 and the SoC 300. 11*ac*:310*c* is connected to the antenna 320 and the SoC 300. WiGig:310*d* is connected to the antenna 320 and the SoC 300. WiGig:310*e* is connected to the antenna 320 and the SoC 300. 11*ac*:310*f* is connected to the antenna 320 and the SoC 300. 11*n*:310*g* is connected to the antenna 320 and the SoC 300. 11*g*:310*h* is connected to the antenna 320 and the SoC 300. Bluetooth 310*i* is connected to the antenna 320 and the SoC 300. The antenna 320 may be shared. Further, multiple antennas 320 may be provided. The combinations of the communication devices (communication chips) 310 and the antenna 320 are an example implementing the wireless communication modules 130 illustrated in the example of FIG. 1. 11*b*:310*a* to 11*g*:310*h* comply with the "IEEE 802.11 standard" which is the international standard of the wireless communication standard and includes "a," "a/b," "b/g," "a/b/g/n," and the like. Of course, Wireless Fidelity (Wi-Fi) which is a product complying with the above-described standard may be used. Especially, IEEE802.11ad which is a wireless communication standard of the 60 GHz band may be adopted. That is, WiGig (Wireless Gigabit) which is a product complying with IEEE802.11ad may be used. As the transmission method of the wireless communication, transmission methods such as Bluetooth 310*i* other than the "IEEE802.11 standard" may be used.

The SoC 300 is connected to 11*b*:310*a*, 11*a*:310*b*, 11*ac*:310*c*, WiGig:310*d*, WiGig:310*e*, 11*ac*:310*f*, 11*n*:310*g*, 11*g*:310*h*, Bluetooth 310*i*, the system memory 342, the hard disk 344, the USB device 346, and the ASIC 330. The SoC 300 is an example implementing the communication control module 110. The SoC 300 mainly controls the communication devices (communication chips) 310, the system memory 342, the hard disk 344, and the USB device 346.

The system memory 342 is connected to the SoC 300. The system memory 342 is, for example, a memory used for executing programs of the communication control module 110.

The hard disk 344 is connected to the SoC 300. In the hard disk 344, for example, communication contents are stored.

The USB device 346 is connected to the SoC 300. The USB device 346 reads from and writes into, for example, an external connection device such as a removable storage medium and an IC card. In addition, another communication device may be connected.

The ASIC 330 is connected to the SoC 300, the user interface 332, the scanner 334, and the printer 336. The ASIC 330 controls the scanner 334, the printer 336, the user interface 332 and the like to implement the main functions of the image processing apparatus 200.

The user interface 332 is connected to the ASIC 330. The user interface 332 receives an operation by a user and presents a message or the like to the user by controlling, for example, a liquid crystal display also serving as a touch panel. In addition, the user interface 332 may receive the user's operation (including gaze, gesture, voice, and the like) using a mouse, a keyboard, a camera, a microphone or the like, and may present a message to the user by voice output from a loudspeaker or touch sense using a touching device.

The scanner 334 is connected to the ASIC 330. The scanner 334 reads an image of an original document and transmits the image.

The printer 336 is connected to the ASIC 330. The printer 336 performs printing according to a printing instruction received by the communication devices (communication chips) 310 or the user interface 332.

Figure 4A:
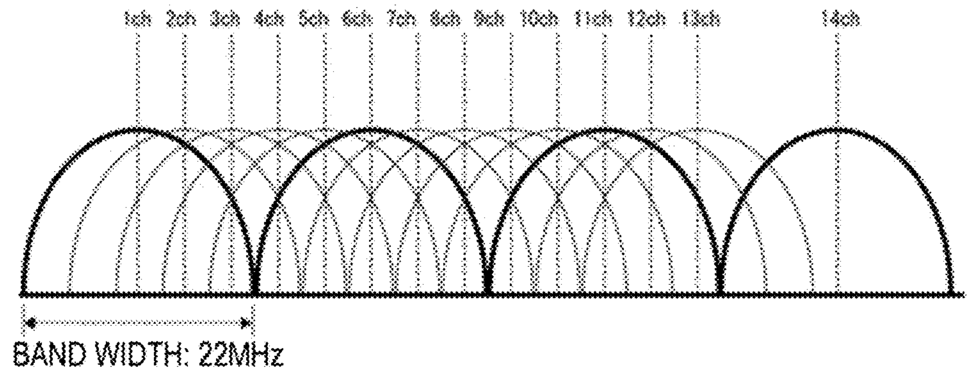
FIGS. 4A and 4B are explanatory views illustrating examples of channels.
Figure 4B:
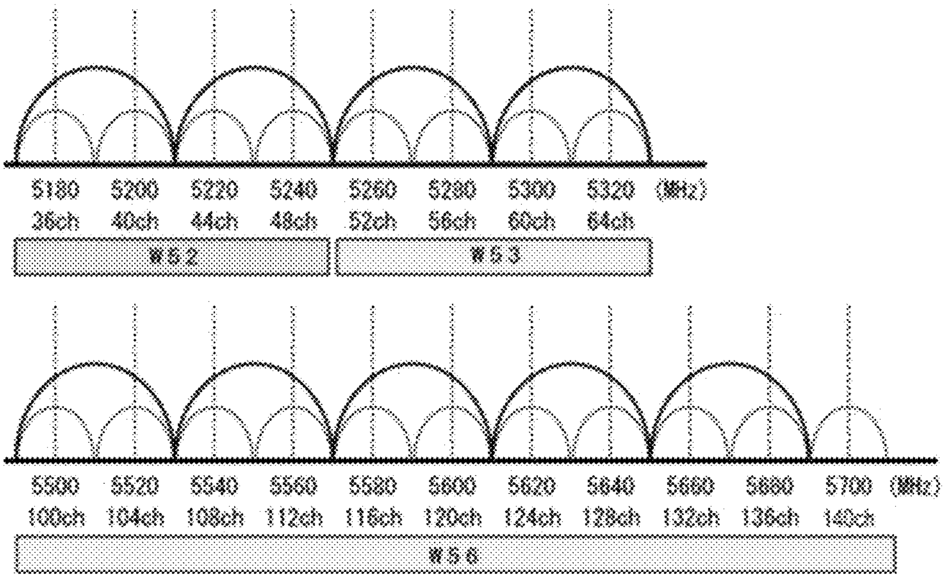

FIGS. 4A and 4B are explanatory diagrams illustrating examples of channels.

For example, descriptions will be made on channels in the "2.4 GHz band" and the "5 GHz band" of the "IEEE 802.11 standard."

The wireless standard using the "2.4 GHz band" is easily affected by other devices and is difficult to conduct a stable communication. For example, if a microwave oven or another identical wireless LAN device exists nearby, the communication often becomes unstable. Meanwhile, compared to the "5 GHz band," radio waves reach far away and are less affected by an obstacle or the like. Further, the "2.4 GHz band" is used by many devices and highly compatible.

Since the "5 GHz band" is used by a small number of devices, the "5 GHz band" is less affected by a microwave oven and the like and may be expected to conduct a stable communication. Meanwhile, when a blocking object exists, the "5 GHz band" is easily affected by the blocking object, as compared to the "2.4 GHz band," and may not conduct a stable communication as the walls increase.

In the above-described IEEE802.11ad of the 60 GHz band, while the possible communication distance is as short as about 10 m, a large capacity and high-speed communication may be conducted. Although IEEE802.11ad of the 60 GHz may not pass over a blocking object due to the strong straight traveling property, the transmission and reception characteristic may be improved by adopting the directivity control by multiple antennas. As described above, since merits and demerits exist depending on the transmission methods, it is effective to switch a transmission method even during a communication.

In addition, it may be effective to switch a channel even during a communication.

The range of frequencies that may be used in a wireless communication is fixed. A frequency band to be used is divided into "channels" within the range such that multiple communication devices may conduct communications simultaneously using different channels.

In IEEE802.11b/g/n using the 2.4 GHz band, the frequency band is divided into 13 channels of 1 ch to 13 ch each having the channel width of 20 MHz.

In IEEE802.11a/n/ac using the 5 GHz band, the frequency band is divided into 19 channels of 36 ch to 64 ch and 100 ch to 140 ch each having the channel width of 20/40 MHz and 80/160 MHz.

In IEEE802.11ad using the 60 GHz band, the frequency band is divided into four channels of 1 ch to 4 ch each having the channel width of 9 GHz.

As illustrated in the example of FIG. 4A, in IEEE802.11b/g/n using the 2.4 GHz band, for example, 1 ch has the center frequency of 2,412 MHz and the band of 2,401 MHz to 2,423 MHz, 2 ch has the center frequency of 2,417 MHz and the band of 2,406 MHz to 2,428 MHz, 3 ch has the center frequency of 2,422 MHz and the band of 2,411 MHz to 2,433 MHz, 4 ch has the center frequency of 2,417 MHz and the band of 2,416 MHz to 2,438 MHz, 5 ch has the center frequency of 2,432 MHz and the band of 2,421 MHz to 2,443 MHz, 6 ch has the center frequency of 2,437 MHz and the band of 2,426 MHz to 2,448 MHz, 7 ch has the center frequency of 2,442 MHz and the band of 2,431 MHz to 2,453 MHz, 8 ch has the center frequency of 2,447 MHz and the band of 2,436 MHz to 2,458 MHz, 9 ch has the center frequency of 2,452 MHz and the band of 2,441 MHz to 2,463 MHz, 10 ch has the center frequency of 2,457 MHz and the band of 2,446 MHz to 2,468 MHz, 11 ch has the center frequency of 2,462 MHz and the band of 2,451 MHz to 2,473 MHz, 12 ch has the center frequency of 2,467 MHz and the band of 2,456 MHz to 2,478 MHz, 13 ch has the center frequency of 2,472 MHz and the band of 2,461 MHz to 2,483 MHz, 14 ch has the center frequency of 2,484 MHz and the band of 2,473 MHz to 2,495 MHz.

As described above, the frequency band of a channel overlaps with the frequency band of an adjacent channel. This is called an "overlap." Specifically, in a case of the "channel width of 20 MHz," three channels overlap with each other in the front and rear portions. In a case of the "channel width of 22 MHz," four channels overlap with each other in the front and rear portions. These channels are in the mutually interfering relationship.

That is, when one unit uses "1 ch" and another unit uses "2 ch" in a wireless communication, the channels interfere with each other. As a result, the communication may become unstable.

In a case where three (or four) channels overlap with each other, shifting the channels by the number of overlapping channels+1 avoids interference between the channels. If "1 ch, 5 ch, 9 ch, and 13 ch" are used in the case of the "channel width of 20 MHz," and "1 ch, 6 ch, 11 ch (2 ch, 7 ch, and 12 ch or 3 ch, 8 ch, and 13 ch)" are used in the case of the "channel width of 22 MHz," the communication becomes stable. Thus, the channels that may be expected to conduct a stable communication (non-overlapping channels) are the four (or three) channels.

As illustrated in the example of FIG. 4B, in IEEE802.11a/n/ac using the 5 GHz band, 19 channels are present. The frequency bands of the respective channels are independent and do not interfere with each other. That is, the interference does not occur even if an adjacent channel is allocated. Thus, if the 5 GHz band is used, not only the interference with other devices disappears but also the interference with the channels disappears.

In addition, as the switching of a channel, a "channel bonding" function (a high speed mode) may be included. That is, as the switching of a channel, added are switching of a wireless communication which does not use the channel bonding function to a wireless communication which uses the channel bonding function, switching of a wireless communication which uses the channel bonding function to a wireless communication which does not use the channel bonding function and switching between wireless communications that use the channel bonding function. The channel bonding function is a technique of using two channels simultaneously and bonding the channels to each other so as to increase the communication speed. For example, the band occupied by one channel is 20 MHz. If the bands of two channels are bonded to each other, a communication is conducted in the 40 MHz band. It should be noted that if the channel bonding function is used, the number of available channels decreases, and the interference may easily occur. Further, a master device and an associated device are required to conform to the channel bonding function.

In addition, as the switching of a transmission method, "multiple input, multiple output (MIMO)" may be included. That is, as the switching of a transmission method, added are changing of a wireless communication which does not use the MIMO to a wireless communication which uses the MIMO, changing of a wireless communication which uses the MIMO to a wireless communication which does not use the MIMO, and changing between antennas according to the MIMO The MIMO is a technique in which both a transmitter and a receiver use multiple antennas in a wireless communication so as to implement a high speed communication. In addition, a master device and an associated device are required to conform to the MIMO.

Figure 5:
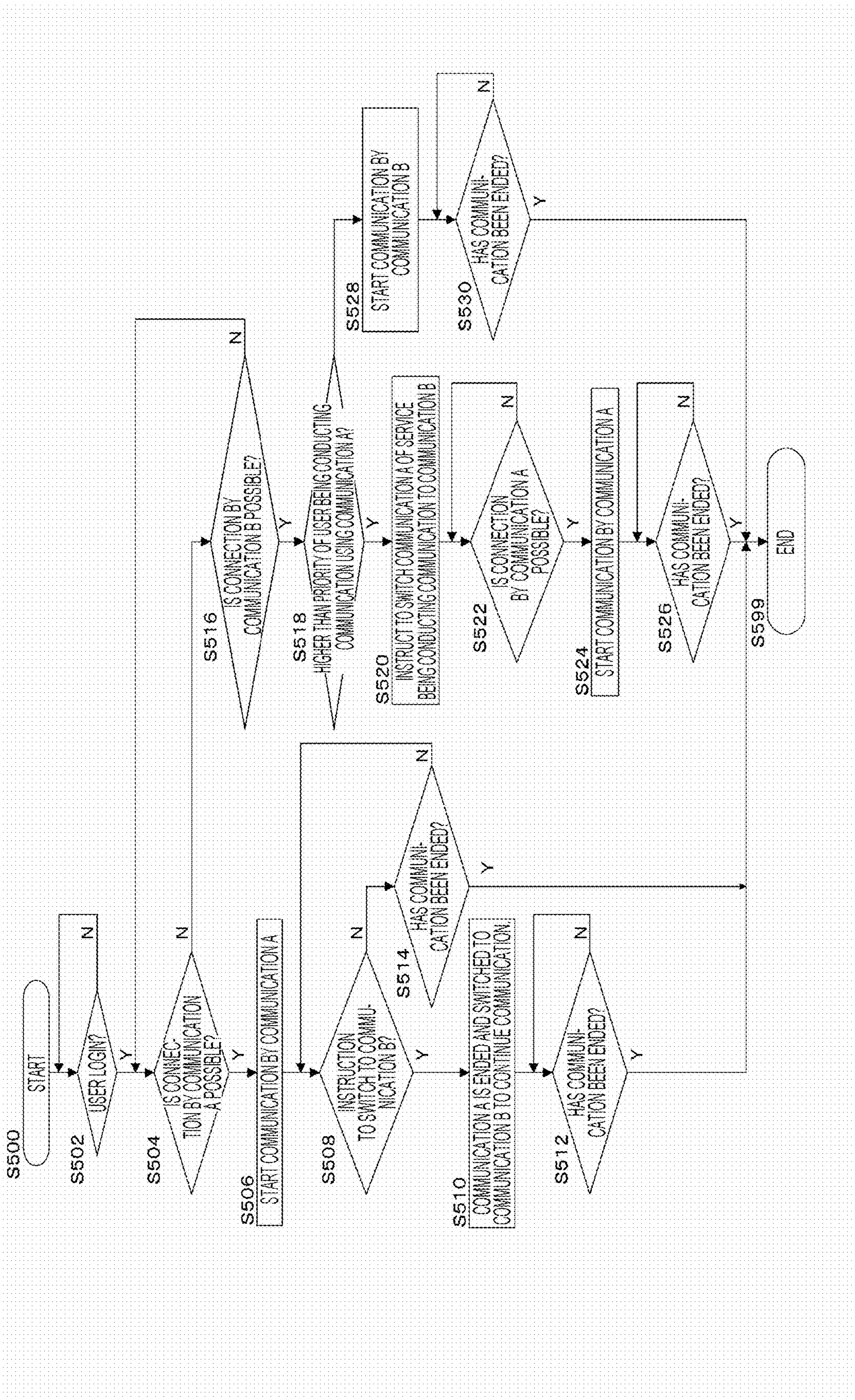
FIG. 5 is a flowchart illustrating an exemplary process by the exemplary embodiment.

FIG. 5 is a flowchart illustrating an exemplary process by the present exemplary embodiment.

Hereinafter, in the descriptions of the flowchart, for example, a communication A indicating a transmission method is the WiGig communication, and a communication B indicating a transmission method is another Wi-Fi communication.

In step S502, it is determined whether login has been performed by a user's operation. If it is determined that the login has been performed, the process proceeds to step S504. Otherwise, the process stands by until the login is performed. Here, the login process may be performed by any of the transmitting-side machine and the receiving-side machine. For example, the login process may be a process of inputting a user name and a password, a process of reading an IC card storing a user ID or the like, biometric authentication such as fingerprint authentication, cooperative authentication or the like. In addition, the login process may be any other process (for example, a process of simply inputting a user name) as long as the process identifies the user who is instructing a communication. The same is true on the "login" in the following descriptions.

In step S504, it is determined whether a connection by the communication A is possible. If it is determined that the connection by the communication A is possible, the process proceeds to step S506. Otherwise (for example, when the communication A has already been used), the process proceeds to step S516.

In step S506, communication is started by the communication A.

In step S508, it is determined whether an instruction to switch the communication A to the communication B has been made. If it is determined that the instruction has been made, the process proceeds to step S510. Otherwise, the process proceeds to step S514.

In step S510, the communication A is ended and switched to the communication B to continue the communication.

In step S512, it is determined whether the communication has been ended. If it is determined that the communication has been ended, the process is ended (step S599). Otherwise, the process stands by until the communication is ended.

In step S514, it is determined whether the communication has been ended. If it is determined that the communication has been ended, the process is ended (step S599). Otherwise, the process returns to step S508.

In step S516, it is determined whether a connection by the communication B is possible. If it is determined that the connection by the communication B is possible, the process proceeds to step S518. Otherwise, the process returns to step S504.

Figure 6:
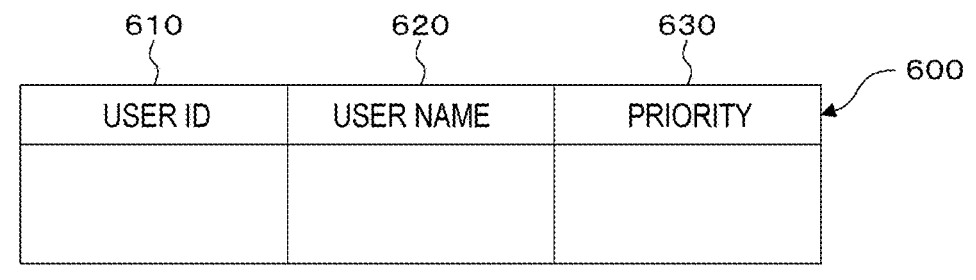

In step S518, it is determined whether the priority of a user who is attempting to start a communication is higher than the priority of a user who is conducting a communication using the communication A. If it is determined that the priority of the user who is attempting to start the communication is higher, the process proceeds to step S520. Otherwise, the process proceeds to step S528. Specifically, a user information table 600 is used for the priority comparing process. FIG. 6 is an explanatory view illustrating an exemplary data structure of the user information table 600. The user information table 600 includes a user ID column 610, a user name column 620, and a priority column 630. A priority corresponding to a user is stored. The user ID column 610 stores information for uniquely identifying a user (user ID: Identification), in the present exemplary embodiment. The user name column 620 stores a user name of the user of the user ID. The priority column 630 stores the priority of the user.

In step S520, an instruction is made to switch the communication A of the service that is conducting communication to the communication B. The instruction in step S520 corresponds to the instruction received in step S508.

In step S522, it is determined whether a connection by the communication A is possible. If it is determined that the connection by the communication A is possible, the process proceeds to step S524. Otherwise, the process stands by until the connection becomes possible.

In step S524, communication is started by the communication A.

In step S526, it is determined whether the communication has been ended. If it is determined that the communication has been ended, the process is ended (step S599). Otherwise, the process stands by until the communication is ended.

In step S528, communication is started by the communication B.

In step S530, it is determined whether the communication has been ended. If it is determined that the communication has been ended, the process is ended (step S599). Otherwise, the process stands by until the communication is ended.

For example, the information processing apparatus 100 is equipped with (i) the wireless communication A module 130A having a fast communication speed (the communication A in the flowchart, for example, WiGig) and (ii) the wireless communication B module 130B having a slow communication speed (the communication B in the flowchart, for example, Wi-Fi slower than WiGig). The connection priority of one of the wireless communication modules 130 is set to be higher than that of the other. For example, the connection priority of the wireless communication A module 130A having the fast communication speed is set to be high. Thus, if a communication is attempted to be started in response to a communication request from the communication device 180B and if the wireless communication A module 130A having the fast communication speed is not being used, the wireless communication A module 130A is used. If the communication is attempted to be started in response to a communication request made from the communication device 180B and if the wireless communication A module 130A having the fast communication speed is being used, the wireless communication A module 130A being used in communication is switched to the wireless communication B module 130B having the slow communication speed, and a communication is started by the free wireless communication A module 130A having the fast communication speed.

Here, in order to determine whether to switch the wireless communication module 130 of the service that is conducting the communication, the priority of the user who is conducting the communication is compared with the priority of the user who is attempting to start a communication from now on. If the user having the higher priority than that of the user who is conducting the communication is attempting to start a communication, the wireless communication module 130 of the user who is conducting the communication is switched.

As an example of the priority, if the users are in the relationship of a superior and a subordinate, the priority of the user B as a superior is set to be higher than the priority of the user A as a subordinate. Specifically, it is assumed that the priority of the user B is 1 and that the priority of the user A is 2. It is further assumed that the priority 1 is higher than the priority 2. In this case, if the user B performs login and starts a communication while the user A is conducting a communication using the wireless communication A module 130A having the fast communication speed (for example, WiGig), the wireless communication A module 130A of the user A who is conducting the communication is switched to the wireless communication B module 130B having the slow communication speed (for example, another Wi-Fi), and the user B starts the communication using the communication unit having the fast communication speed (WiGig).

In addition, if the priorities of the users are equal to each other, the wireless communication module 130 may be selected with the assumption that priorities are assigned to users from the highest priority to the lowest priority in order of descending order from a user who is earliest registered in the user information table 600. In this case, a registration date/time column may be added to the user information table 600.

Figure 7:
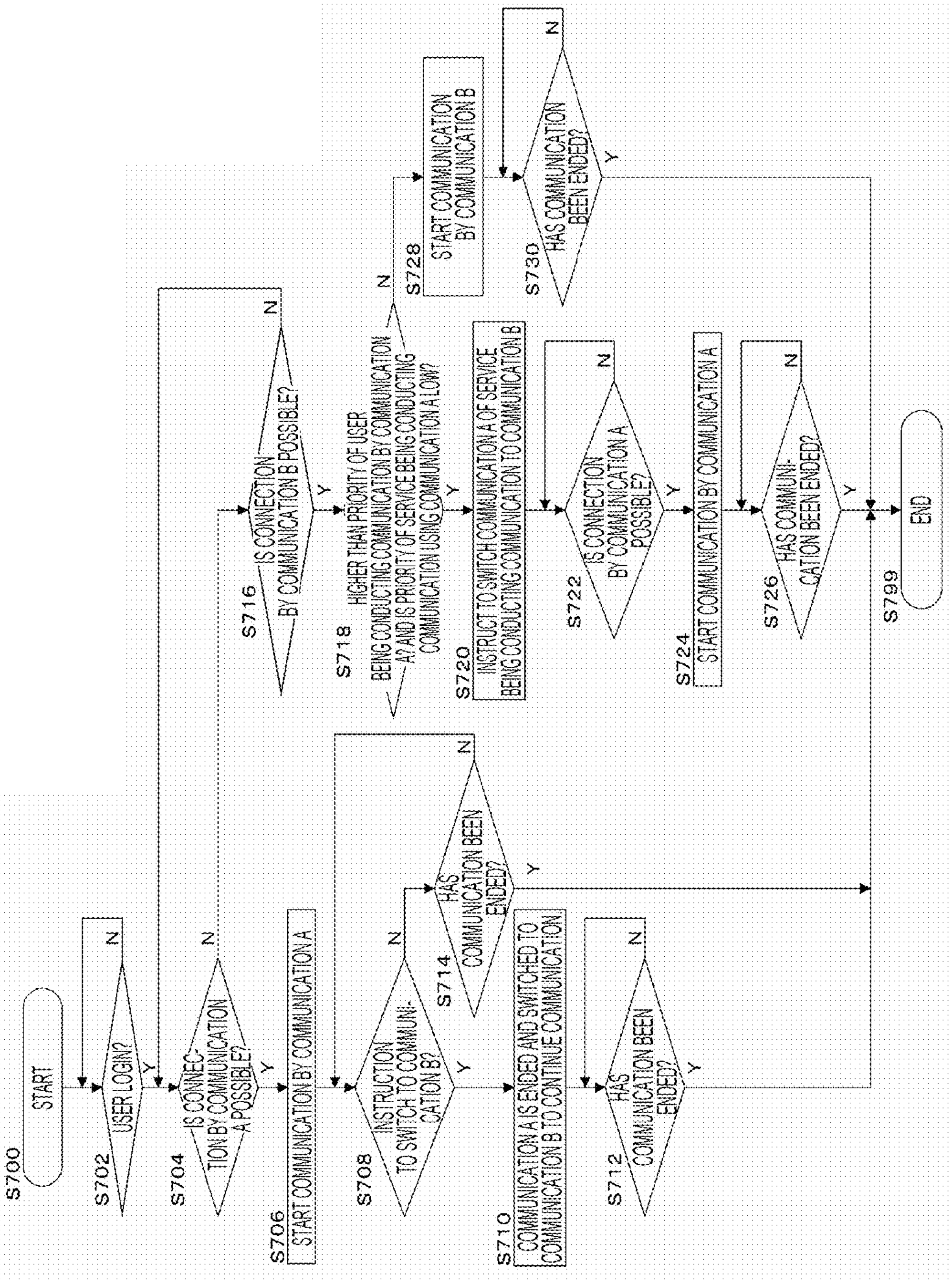
FIG. 7 is a flowchart illustrating an exemplary process by the exemplary embodiment.

FIG. 7 is a flowchart illustrating an exemplary process by the present exemplary embodiment.

Hereinafter, in the descriptions of the flowcharts, for example, the communication A as a transmission method is the WiGig communication, and the communication B as a communication method is another Wi-Fi communication.

In step S702, it is determined whether login has been performed by a user's operation. If it is determined that the login has been performed, the process proceeds to step S704. Otherwise, the process stands by until the login is performed.

In step S704, it is determined whether a connection by the communication A is possible. If it is determined that the connection by the communication A is possible, the process proceeds to step S706. Otherwise (for example, when the communication A has already been used), the process proceeds to step S716.

In step S706, communication is started by the communication A.

In step S708, it is determined whether an instruction to switch the communication A to the communication B has been made. If it is determined that the instruction has been made, the process proceeds to step S710. Otherwise, the process proceeds to step S714.

In step S710, the communication A is ended and switched to the communication B, and the communication is continued.

In step S712, it is determined whether the communication has been ended. If it is determined that the communication has been ended, the process is ended (step S799). Otherwise, the process stands by until the communication is ended.

In step S714, it is determined whether the communication has been ended. If it is determined that the communication has been ended, the process is ended (step S799). Otherwise, the process returns to step S708.

In step S716, it is determined whether a connection by the communication B is possible. If it is determined that a connection by the communication B is possible, the process proceeds to step S718. Otherwise, the process returns to step S704.

In step S718, it is determined whether the priority of the user who is attempting to start a communication is higher than the priority of the user who is conducting a communication using the communication A and whether the priority of the service that is conducting the communication using the communication A is low (as compared to the priority of the service that is attempting to start the communication). If it is determined that the priority of the user who is attempting to start the communication is higher than the priority of the user who is conducting the communication using the communication A and that the priority of the service that is conducting the communication using the communication A is low, the process proceeds to step S720. Otherwise, the process proceeds to step S728.

In the determination process of step S718, if the priorities of the users are equal to each other, the comparison result of the priorities of the services may be used. That is, if the priorities of the users are equal to each other and if the priority of the service that is conducting the communication by the communication A is low, the process may proceed to step S720. Otherwise, the process may proceed to step S728.

In step S720, an instruction is made to switch the communication A of the service that is conducting communication, to the communication B. The instruction in step S720 corresponds to the instruction received in step S708.

In step S722, it is determined whether a connection by the communication A is possible. If it is determined that a connection by the communication A is possible, the process proceeds to step S724. Otherwise, the process stands by until the connection becomes possible.

In step S724, communication is started by the communication A.

In step S726, it is determined whether the communication has been ended. If it is determined that the communication has been ended, the process is ended (step S799). Otherwise, the process stands by until the communication is ended.

In step S728, communication is started by the communication B.

In step S730, it is determined whether the communication has been ended. If it is determined that the communication has been ended, the process is ended (step S799). Otherwise, the process stands by until the communication is ended.

Figure 8:
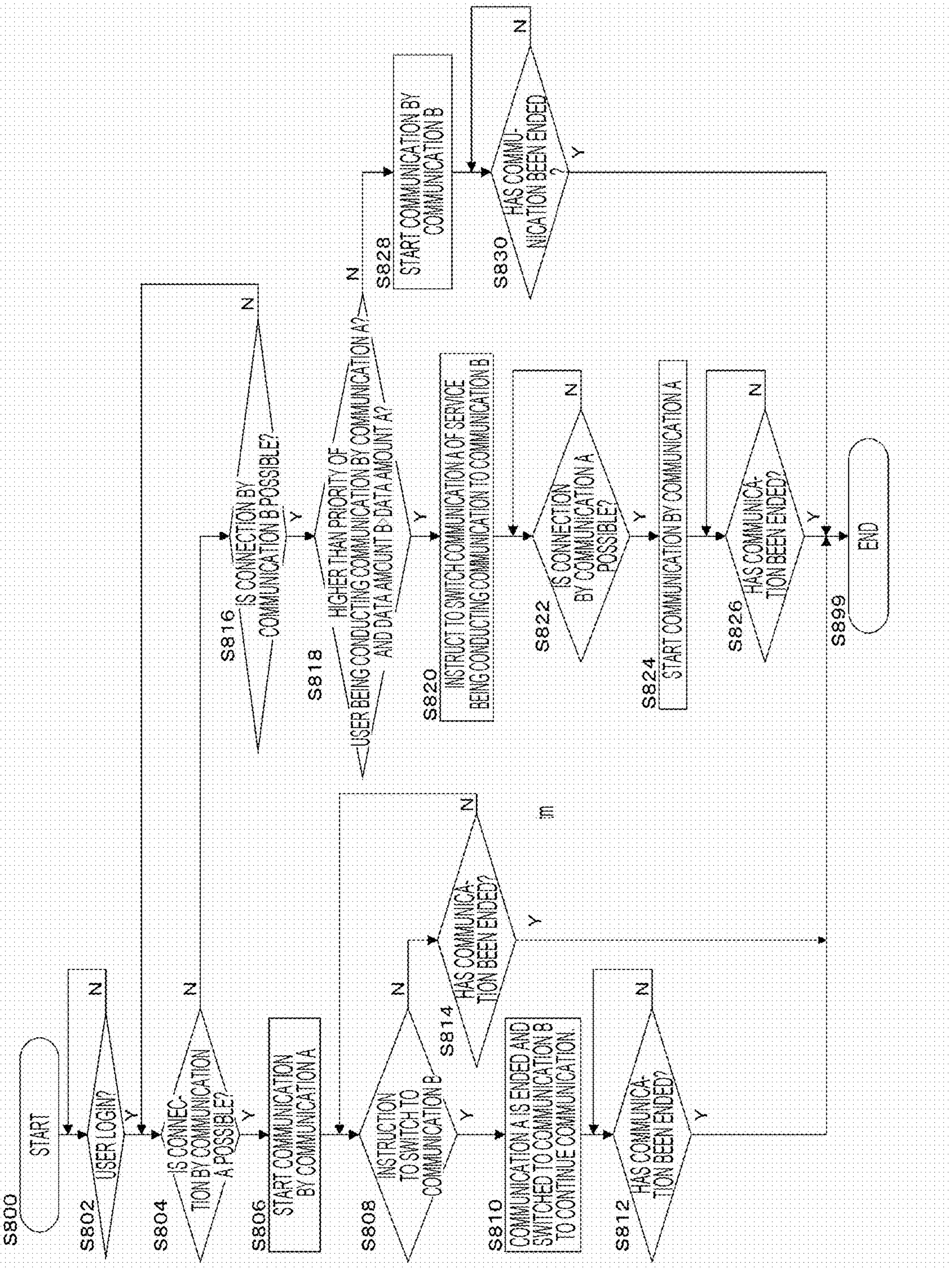
FIG. 8 is a flowchart illustrating an exemplary process by the exemplary embodiment.

FIG. 8 is a flowchart illustrating an exemplary process by the present exemplary embodiment.

In this flowchart, the "data amount A" refers to a remaining data amount of a service that is conducting a communication by the communication A. The "data amount B" refers to a data amount of a service that is attempting to start a communication from now on.

In step S802, it is determined whether login has been performed by a user's operation. If it is determined that the login has been performed, the process proceeds to step S804. Otherwise, the process stands by until the login is performed.

In step S804, it is determined whether a connection by the communication A is possible. If it is determined that the connection by the communication A is possible, the process proceeds to step S806. Otherwise (for example, when the communication A has already been used), the process proceeds to step S816.

In step S806, communication is started by the communication A.

In step S808, it is determined whether an instruction to switch the communication A to the communication B has been made. If it is determined that the instruction has been made, the process proceeds to step S810. Otherwise, the process proceeds to step S814.

In step S810, the communication A is ended and switched to the communication B, and the communication is continued.

In step S812, it is determined whether the communication has been ended. If it is determined that the communication has been ended, the process is ended (step S899). Otherwise, the process stands by until the communication is ended.

In step S814, it is determined whether the communication has been ended. If it is determined that the communication has been ended, the process is ended (step S899). Otherwise, the process returns to step S808.

In step S816, it is determined whether a connection by the communication B is possible. If it is determined that a connection by the communication B is possible, the process proceeds to step S818. Otherwise, the process returns to step S804.

In step S818, it is determined whether the priority of the user who is attempting to start the communication is higher than the priority of the user who is conducting the communication by the communication A and whether the data amount B>the data amount A. If it is determined that the priority of the user who is attempting to start the communication is higher than the priority of the user who is conducting the communication by the communication A and that the data amount B>the data amount A, the process proceeds to step S820. Otherwise, the process proceeds to step S828. That is, if the priority of the user who is attempting to start the communication is high and if the data amount of the service that is attempting to start the communication is larger than the remaining data amount of the service that is conducting the communication, the process proceeds to the process step S820 and subsequent steps for performing the switching.

In addition, in the determination process of step S818, if the priorities of the users are equal to each other, the comparison result of the data amounts may be used. That is, if the priorities of the users are equal to each other and if the data amount B>the data amount A, the process may proceed to step S820. Otherwise, the process may proceed to step S828.

In step S820, an instruction is made to switch the communication A of the service that is conducting the communication, to the communication B. The instruction in step S820 corresponds to the instruction received in step S808.

In step S822, it is determined whether a connection by the communication A is possible. If it is determined that a connection by the communication A is possible, the process proceeds to step S824. Otherwise, the process stands by until the connection becomes possible.

In step S824, communication is started by the communication A.

In step S826, it is determined whether the communication has been ended. If it is determined that the communication has been ended, the process is ended (step S899). Otherwise, the process stands by until the communication is ended.

In step S828, communication is started by the communication B.

In step S830, it is determined whether the communication has been ended. If it is determined that the communication has been ended, the process is ended (step S899). Otherwise, the process stands by until the communication is ended.

In the information processing apparatus 100, when the service that is conducting a communication uses the wireless communication A module 130A having the fast communication speed, the remaining data amount of the service that is conducting the communication is compared with the data amount of the service that is attempting to start a communication from now on. If the data amount of the service that is attempting to start the communication from now on is larger, the wireless communication A module 130A used in the service that is conducting the communication is switched to the wireless communication B module 130B. In addition to the condition of the data amount, the switching may be performed on the condition that the priority of the service that is attempting to start the communication from now on is higher than the priority of the service that is conducting the communication.

Figure 9:
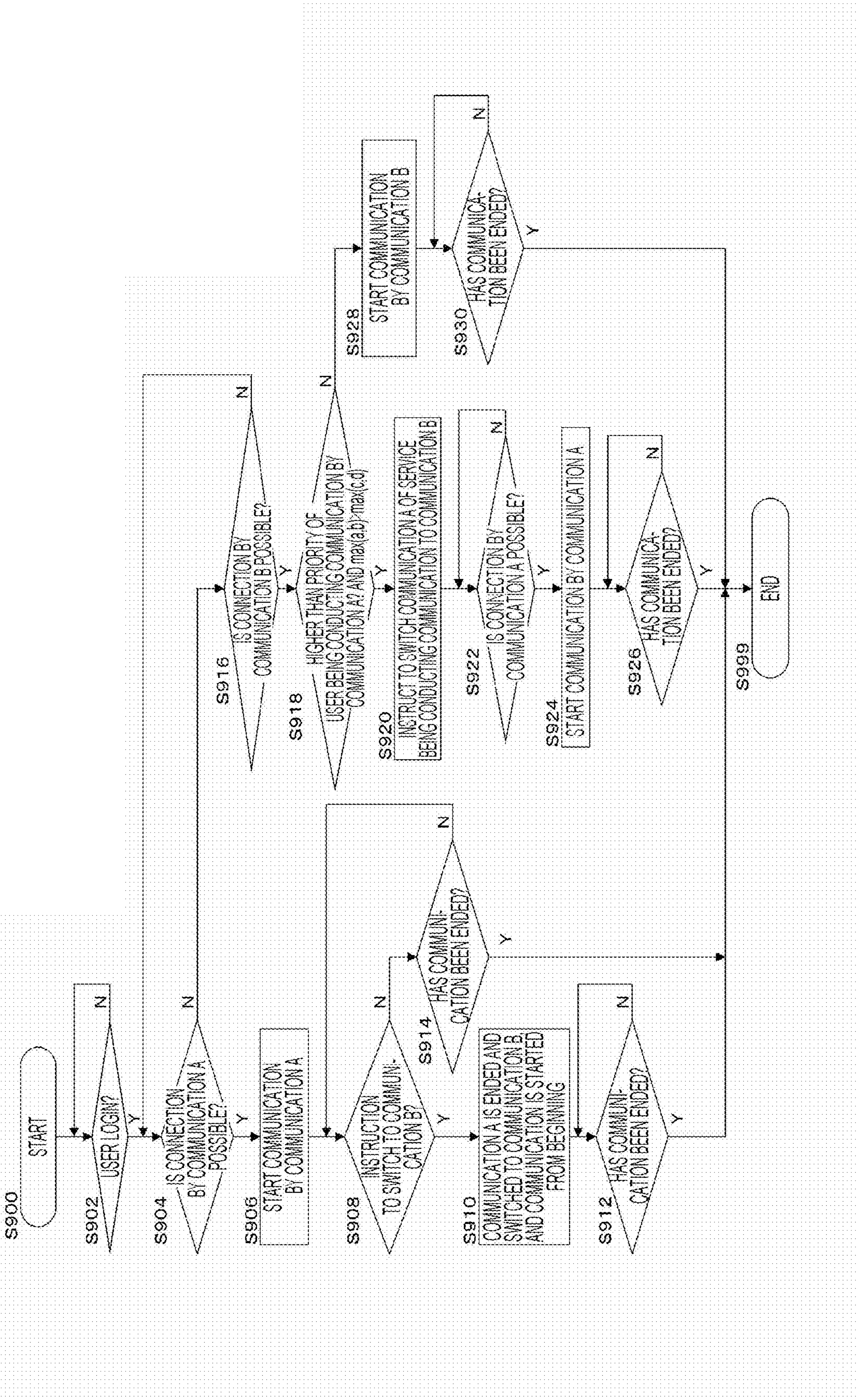
FIG. 9 is a flowchart illustrating an exemplary process by the exemplary embodiment.

FIG. 9 is a flowchart illustrating an exemplary process by the present exemplary embodiment.

In this flowchart, time "a" refers to communication time when the communication of the data amount A is continued by the communication A, time "b" refers to communication time when the communication of the data amount B is conducted by the communication B, time "c" refers to communication time when the communication of the data amount A is conducted by switching the communication A to the communication B, and time "d" refers to communication time when the communication of the data amount B is conducted by the communication A.

In step S902, it is determined whether login has been performed by a user's operation. If it is determined that the login has been performed, the process proceeds to step S904. Otherwise, the process stands by until the login is performed.

In step S904, it is determined whether a connection by the communication A is possible. If it is determined that the connection by the communication A is possible, the process proceeds to step S906. Otherwise (for example, when the communication A has already been used), the process proceeds to step S916.

In step S906, communication is started by the communication A.

In step S908, it is determined whether an instruction to switch the communication A to the communication B has been made. If it is determined that the instruction has been made, the process proceeds to step S910. Otherwise, the process proceeds to step S914.

In step S910, the communication A is ended and switched to the communication B to start the communication from the beginning.

In step S912, it is determined whether the communication has been ended. If it is determined that the communication has been ended, the process is ended (step S999). Otherwise, the process stands by until the communication is ended.

In step S914, it is determined whether the communication has been ended. If it is determined that the communication has been ended, the process is ended (step S999). Otherwise, the process returns to step S908.

In step S916, it is determined whether a connection by the communication B is possible. If it is determined that the connection by the communication B is possible, the process proceeds to step S918. Otherwise, the process returns to step S904.

In step S918, it is determined whether the priority of a user who is attempting to start a communication is higher than the priority of a user who is conducting a communication by the communication A and whether max(a, b)>max (c, d). If it is determined that the priority of the user who is attempting to start the communication by the communication A is higher than the priority of the user who is conducting the communication and max (a, b)>max (c, d), the process proceeds to step S920. Otherwise, the process proceeds to step S928. That is, if the priority of the user who is attempting to start the communication is high and if the communication time in a case where the switching is not performed is longer than the communication time in a case where the switching is performed, the process proceeds to the processes in step S920 and subsequent steps for performing the switching. In this example, it is determined whether to perform the switching, by using respective maximum communication times (that is, the latest time at which the communication is ended). Alternatively, it may be determined whether to perform the switching, by using respective total communication times. That is, the condition of "max (a, b)>max (c, d)" may be replaced with the condition of "(a+b)>(c+d)."

In addition, if the process in step S918 determines that the priorities of the users are equal to each other, the comparison result of the communication times may be used. That is, if the priorities of the users are equal to each other and if max (a, b)>max (c, d), the process may proceed to step S920. Otherwise, the process may proceed to step S928.

In step S920, an instruction is made to switch the communication A of the service that is conducting the communication to the communication B. The instruction in step S920 corresponds to the instruction received in step S908.

In step S922, it is determined whether a connection by the communication A is possible. If it is determined that a connection by the communication A is possible, the process proceeds to step S924. Otherwise, the process stands by until the connection becomes possible.

In step S924, communication is started by the communication A.

In step S926, it is determined whether the communication has been ended. If it is determined that the communication has been ended, the process is ended (step S999). Otherwise, the process stands by until the communication is ended.

In step S928, communication is started by the communication B.

In step S930, it is determined whether the communication has been ended. If it is determined that the communication has been ended, the process is ended (step S999). Otherwise, the process stands by until the communication is ended.

In the information processing apparatus 100, if the service that is conducting a communication uses the wireless communication A module 130A having the fast communication speed, the time taken to conduct the communication by each wireless communication module 130 is calculated based on the remaining data amount of the service that is conducting the communication, the data amount of the service that is attempting to start the communication from now on, and the communication speed of each wireless communication module 130. If it is determined that continuing the communication will end the communication in a shorter time compared to a case where the wireless communication module 130 is switched, the wireless communication module 130 is not switched. In addition, if it is determined that switching the wireless communication module 130 ends the communication in a shorter time, the wireless communication module 130 is switched. In addition to the condition of the communication time, the switching may be performed on the condition that the priority of the service that is attempting to start the communication from now on is higher than the priority of the service that is conducting the communication.

Figure 10:
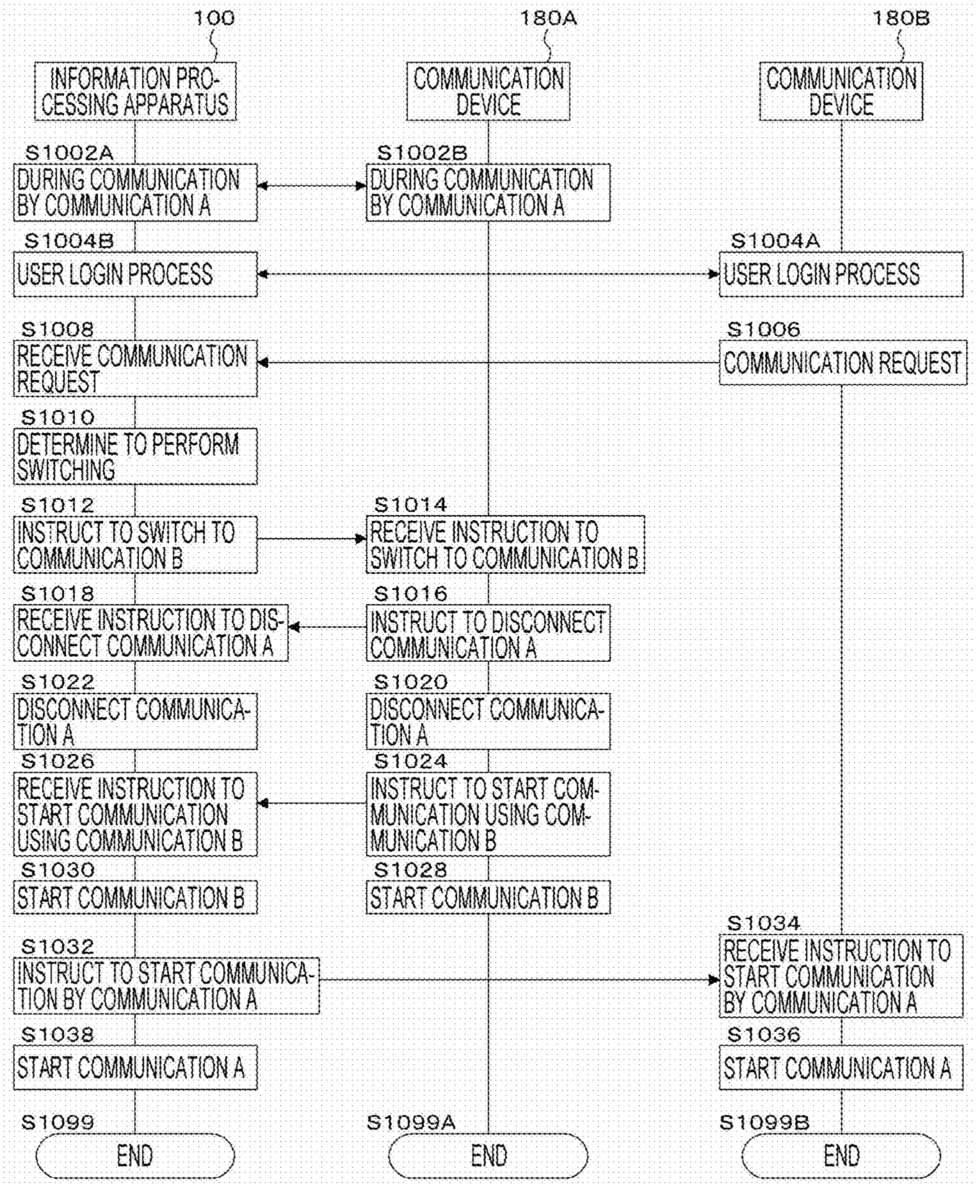
FIG. 10 is a flowchart illustrating an exemplary process by the exemplary embodiment.

FIG. 10 is a flowchart illustrating an exemplary process by the present exemplary embodiment. FIG. 10 illustrates an exemplary process in a case where the switching occurs, among the exemplary processes in the flowcharts illustrated in FIGS. 5, and 7 to 9. FIG. 10 represents an example where when the communication device 180A and the information processing apparatus 100 have already communicated with each other by the communication A having the fast communication speed (for example, the WiGig communication), a communication request is made from the communication device 180B, it is determined that the switching of the communication channels is necessary, the communication with the communication device 180A is switched to the communication B having the slow communication speed (for example, another Wi-Fi communication), and the communication with the communication device 180B is conducted by the communication A having the fast communication speed.

In step S1002A, the information processing apparatus 100 and the communication device 180A are communicating with each other by the communication A.

In step S1002B, the communication device 180A and the information processing apparatus 100 are communicating with each other by the communication A.

In step S1004A, a login process by a user's operation (mainly, a user's input operation) is performed in the communication device 180B.

In step S1004B, a login process by a user's operation (mainly, an authentication process) is performed in the information processing apparatus 100.

In step S1006, the communication device 180B transmits a communication request to the information processing apparatus 100.

In step S1008, the information processing apparatus 100 receives the communication request from the communication device 180B.

In step S1010, the information processing apparatus 100 determines to perform the switching. For example, this case corresponds to the cases where the answer of step S518 is "Y," the answer of step S818 is "Y," and the answer of step S918 is "Y."

In step S1012, the information processing apparatus 100 transmits an instruction to switch the communication A to the communication B, to the communication device 180A.

In step S1014, the communication device 180A receives the instruction to switch the communication A to the communication B, from the information processing apparatus 100.

In step S1016, the communication device 180A transmits an instruction to disconnect the communication A, to the information processing apparatus 100.

In step S1018, the information processing apparatus 100 receives the instruction to disconnect the communication A, from the communication device 180A.

In step S1020, the communication device 180A disconnects the communication A with the information processing apparatus 100.

In step S1022, the information processing apparatus 100 disconnects the communication A with the communication device 180A.

In step S1024, the communication device 180A transmits an instruction to start a communication by the communication B, to the information processing apparatus 100.

In step S1026, the information processing apparatus 100 receives the instruction to start a communication by the communication B, from the communication device 180A.

In steps S1016 and S1024, the instructions are transmitted from the communication device 180A to the information processing apparatus 100. Alternatively, in reverse, the instructions may be transmitted from the information processing apparatus 100 to the communication device 180A.

In step S1028, the communication device 180A starts the communication B with the information processing apparatus 100.

In step S1030, the information processing apparatus 100 starts the communication B with the communication device 180A.

In step S1032, the information processing apparatus 100 transmits an instruction to start a communication by the communication A, to the communication device 180B.

In step S1034, the communication device 180B receives the instruction to start a communication by the communication A, from the information processing apparatus 100.

In step S1036, the communication device 180B starts the communication A with the information processing apparatus 100.

In step S1038, the information processing apparatus 100 starts the communication A with the communication device 180B.

Figure 11:
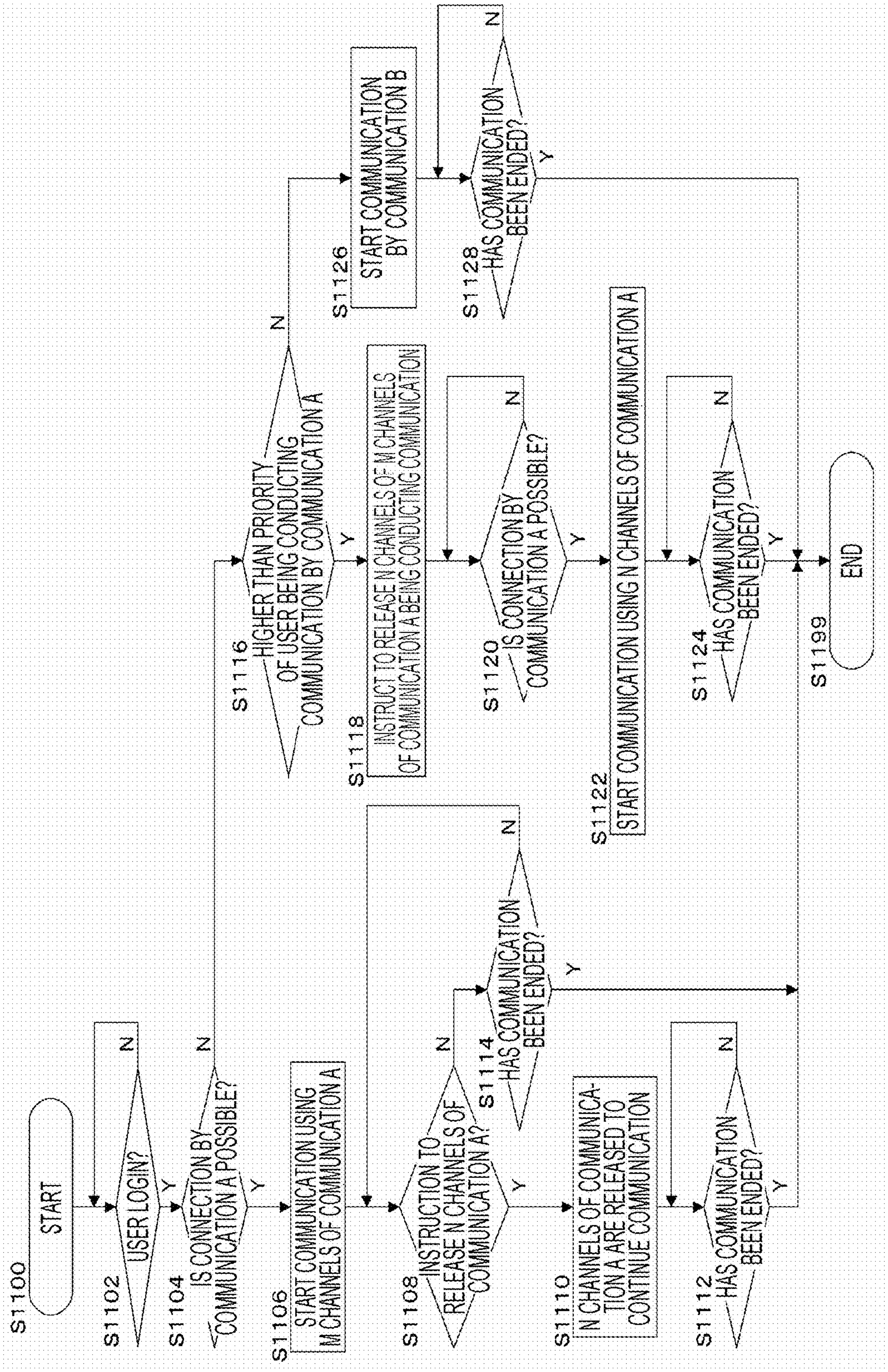
FIG. 11 is a flowchart illustrating an exemplary process by the exemplary embodiment.

FIG. 11 is a flowchart illustrating an exemplary process by the present exemplary embodiment.

In the flowchart of FIG. 11, M channels refer to the number of channels that may be used by the communication A at the same time (the number of channels used by the channel bonding). M channels are, for example, "four channels" when the communication A is WiGig. N channels refer to the number of channels that is smaller than the M channels. N channels are, for example, "two channels." For example, when all of the four channels of the wireless communication module 130 (WiGig) having the fast communication speed are used, the four channels are reduced by two, and the two channels are allocated to the wireless communication module 130 that is attempting to newly start a communication, so as to conduct the communication.

In step S1102, it is determined whether login has been performed by a user's operation. If it is determined that the login has been performed, the process proceeds to step S1104. Otherwise, the process stands by until the login is performed.

In step S1104, it is determined whether a connection by the communication A is possible. If it is determined that the connection by the communication A is possible, the process proceeds to step S1106. Otherwise (for example, when the communication A has already been used), the process proceeds to step S1116.

In step S1106, communication is started using the M channels of the communication A.

In step S1108, it is determined whether an instruction to release the N channels of the communication A has been made. If it is determined that the instruction has been made, the process proceeds to step S1110. Otherwise, the process proceeds to step S1114.

In step S1110, the N channels of the communication A are released to continue the communication.

In step S1112, it is determined whether the communication has been ended. If it is determined that the communication has been ended, the process is ended (step S1199). Other, the process stands by until the communication is ended.

In step S1114, it is determined whether the communication has been ended. If it is determined that the communication has been ended, the process is ended (step S1199). Other, the process returns to step S1108.

In step S1116, it is determined whether the priority of a user who is attempting to start a communication is higher than the priority of a user who is conducting a communication by the communication A. If it is determined that the priority of the user who is attempting to start the communication is higher than the priority of the user who is conducting the communication by the communication A, the process proceeds to step S1118. Otherwise, the process proceeds to step S1126.

In addition, the determination process of step S1116 may be replaced with the determination process of any of step S718, S818, of S918 in the flowcharts illustrated in the examples of FIGS. 7 to 9.

In step S1118, an instruction is made to release the N channels of the M channels of the communication A that is conducting the communication. The instruction in step S1118 corresponds to the instruction received in step S1108.

In step S1120, it is determined whether a connection by the communication A is possible. If it is determined that the connection by the communication A is possible, the process proceeds to step S1122. Otherwise, the process stands by until the connection becomes possible.

In step S1122, communication is started using the N channels of the communication A.

In step S1124, it is determined whether the communication has been ended. If it is determined that the communication has been ended, the process is ended (step S1199). Other, the process stands by until the communication is ended.

In step S1126, communication is started by the communication B. In this example, the communication is conducted by the communication B. Alternatively, the communication stands by until the communication A becomes free.

In step S1128, it is determined whether the communication has been ended. If it is determined that the communication has been ended, the process is ended (step S1199). Other, the process stands by until the communication is ended.

Figure 12:
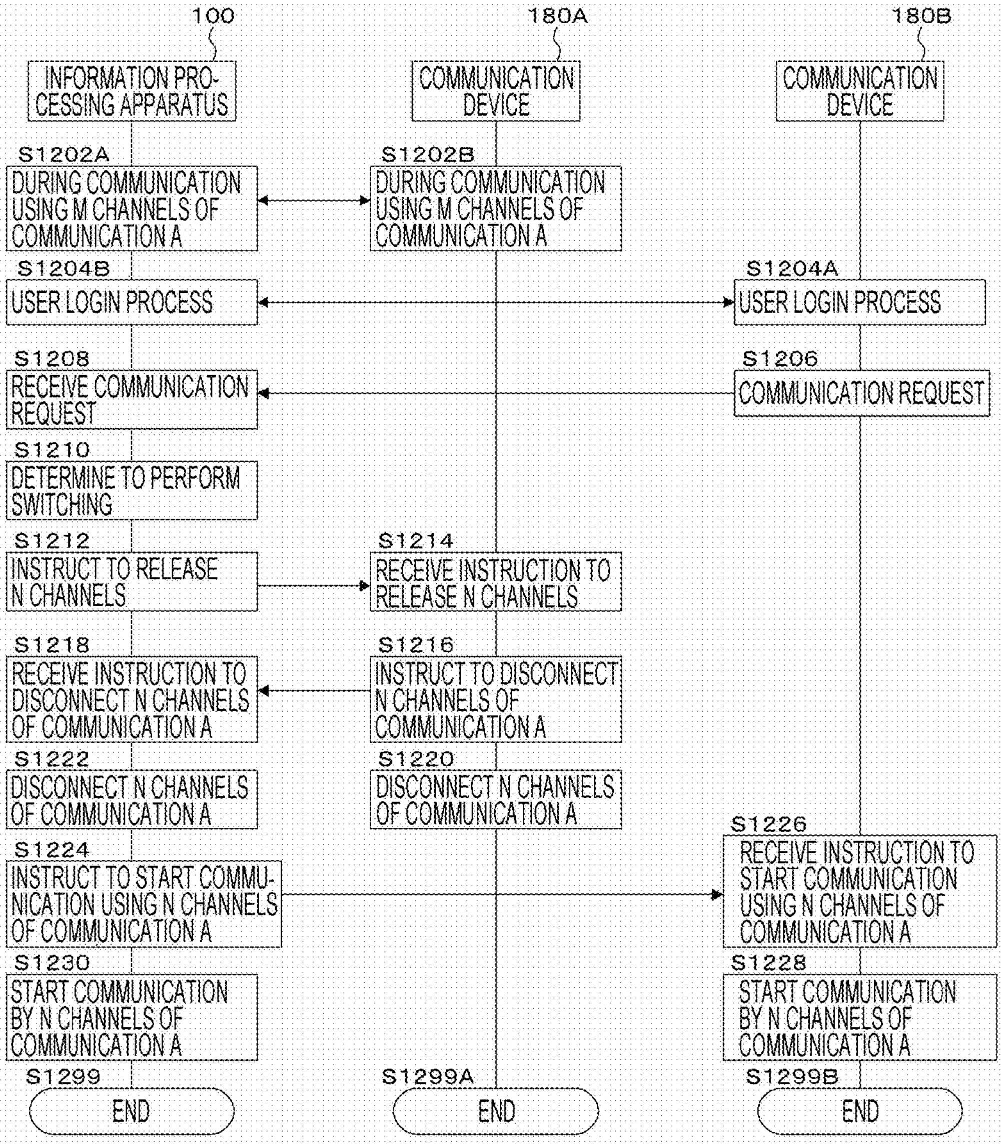
FIG. 12 is a flowchart illustrating an exemplary process according to the exemplary embodiment.

FIG. 12 is a flowchart illustrating an exemplary process according to the present exemplary embodiment. FIG. 12 illustrates an exemplary process in a case where the switching of the number of the channels occurs in the exemplary process of the flowchart illustrated in FIG. 11. FIG. 12 represents an example where when the communication device 180A and the information processing apparatus 100 have already communicated with each other by using the M channels of the communication A having the fast communication speed (for example, the WiGig communication), a communication request is made from the communication device 180B, it is determined that the switching of the communication channels is necessary, the communication with the communication device 180A is switched to a communication by (M-N) channels, and the communication with the communication device 180B is conducted by using the N channels of the communication A.

In step S1202A, the information processing apparatus 100 and the communication device 180A are communicating with each other using the M channels of the communication A.

In step S1202B, the communication device 180A and the information processing apparatus 100 are communicating with each other using the M channels of the communication A.

In step S1204A, a login process by a user's operation (mainly, a user's input operation) is performed in the communication device 180B.

In step S1204B, a login process by a user's operation (mainly, an authentication process) is performed in the information processing apparatus 100.

In step S1206, the communication device 180B transmits a communication request to the information processing apparatus 100.

In step S1208, the information processing apparatus 100 receives the communication request from the communication device 180B.

In step S1210, the information processing apparatus 100 determines to switch the channels.

In step S1212, the information processing apparatus 100 transmits an instruction to release the N channels, to the communication device 180A.

In step S1214, the communication device 180A receives the instruction to release the N channels, from the information processing apparatus 100.

In step S1216, the communication device 180A transmits an instruction to disconnect the communication with the N channels, to the information processing apparatus 100.

In step S1216, the instruction is transmitted from the communication device 180A to the information processing apparatus 100. Alternatively, in reverse, the instruction may be transmitted from the information processing apparatus 100 to the communication device 180A.

In step S1218, the information processing apparatus 100 receives the instruction to disconnect the N channels of the communication, from the communication device 180A.

In step S1220, the communication device 180A disconnects the N channels of the communication with the information processing apparatus 100.

In step S1222, the information processing apparatus 100 disconnects the N channels of the communication with the communication device 180A.

In step S1224, the information processing apparatus 100 transmits an instruction to start a communication using the N channels of the communication A, to the communication device 180B.

In step S1226, the communication device 180B receives the instruction to start a communication using the N channels of the communication A, from the information processing apparatus 100.

In step S1228, the communication device 180B starts a communication with the information processing apparatus 100 by the N channels of the communication A.

In step S1230, the information processing apparatus 100 starts a communication with the communication device 180B by the N channels of the communication A.

Figure 13:
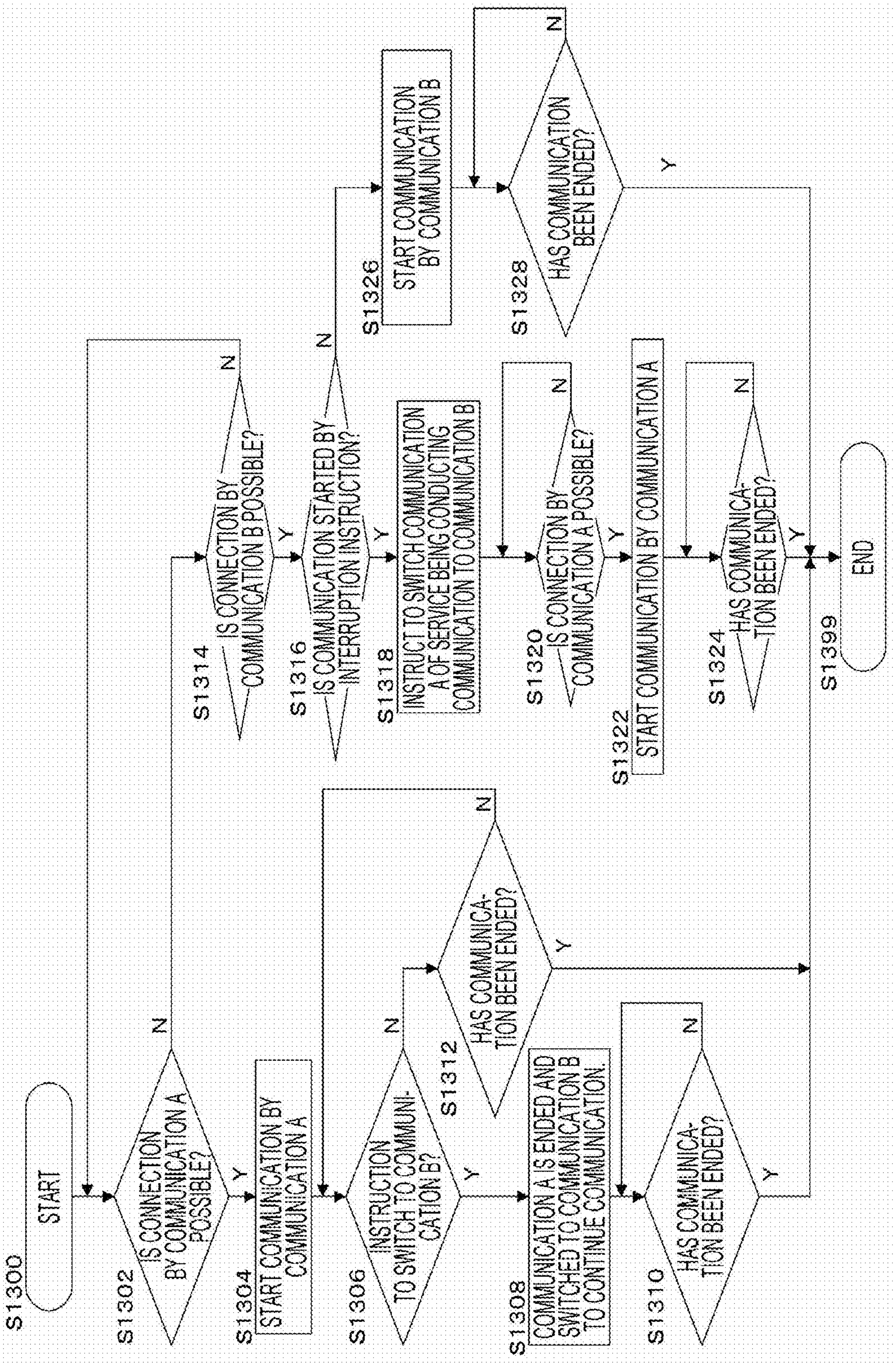
FIG. 13 is a flowchart illustrating an exemplary process according to the exemplary embodiment.

FIG. 13 is a flowchart illustrating an exemplary process according to the present exemplary embodiment.

In step S1302, it is determined whether a connection by the communication A is possible. If it is determined that the connection by the communication A is possible, the process proceeds to step S1304. Otherwise (for example, when the communication A has already been used), the process proceeds to step S1314.

In step S1304, communication is started by the communication A.

In step S1306, it is determined whether an instruction to switch the communication A to the communication B has been made. If it is determined that the instruction has been made, the process proceeds to step S1308. Otherwise, the process proceeds to step S1312.

In step S1308, the communication A is ended and switched to the communication B to continue the communication.

In step S1310, it is determined whether the communication has been ended. If it is determined that the communication has been ended, the process is ended (step S1399). Other, the process stands by until the communication is ended.

In step S1312, it is determined whether the communication has been ended. If it is determined that the communication has been ended, the process is ended (step S1399). Other, the process returns to step S1306.

In step S1314, it is determined whether a connection by the communication B is possible. If it is determined that the connection by the communication B is possible, the process proceeds to step S1316. Otherwise, the process returns to step S1302.

In step S1316, it is determined whether the communication, as a target communication, to be started later includes an interruption instruction. If it is determined that the communication includes the interruption instruction, the process proceeds to step S1318. Otherwise, the process proceeds to step S1326.

In step S1318, an instruction is made to switch the communication A of the service that is conducting the communication to the communication B. The instruction in step S1318 corresponds to the instruction received in step S1306.

In step S1320, it is determined whether a connection by the communication A is possible. If it is determined that the connection by the communication A is possible, the process proceeds to step S1322. Otherwise, the process stands by until the connection becomes possible.

In step S1322, communication is started by the communication A.

In step S1324, it is determined whether the communication has been ended. If it is determined that the communication has been ended, the process is ended (step S1399). Other, the process stands by until the communication is ended.

In step S1326, communication is started by the communication B.

In step S1328, it is determined whether the communication has been ended. If it is determined that the communication has been ended, the process is ended (step S1399). Other, the process stands by until the communication is ended.

Figure 14:
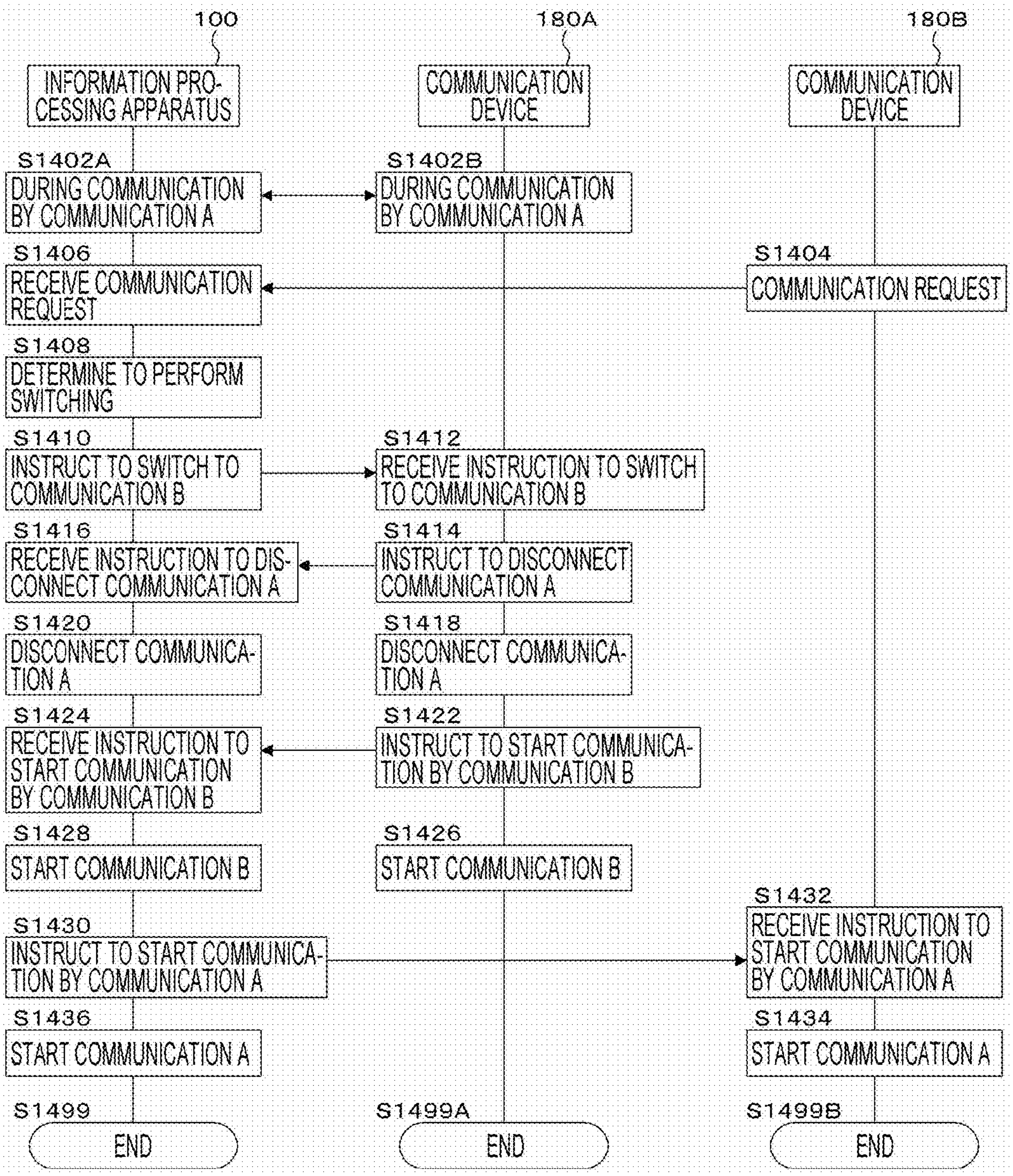
FIG. 14 is a flowchart illustrating an exemplary process according to the exemplary embodiment.

FIG. 14 is a flowchart illustrating an exemplary process according to the present exemplary embodiment. FIG. 14 illustrates an exemplary process in a case where the switching occurs in the exemplary process of the flowchart illustrated in FIG. 13. FIG. 14 represents an example where when the communication device 180A and the information processing apparatus 100 have already communicated with each other by the communication A having the fast communication speed (for example, the WiGig communication), a communication request is made from the communication device 180B, it is determined that the switching of the communication channels is necessary, the communication with the communication device 180A is switched to the communication B having the slow communication speed (for example, another Wi-Fi communication), and the communication with the communication device 180B is conducted by the communication A having the fast communication speed.

In step S1402A, the information processing apparatus 100 and the communication device 180A are communicating with each other by the communication A.

In step S1402B, the communication device 180A and the information processing apparatus 100 are communicating with each other by the communication A.

In step S1404, the communication device 180B transmits a communication request to the information processing apparatus 100. Here, the communication request includes an "interruption instruction."

In step S1406, the information processing apparatus 100 receives the communication request from the communication device 180B.

In step S1408, the information processing apparatus 100 determines to perform the switching. Since the communication request includes the "interruption instruction," the switching process is performed.

In step S1410, the information processing apparatus 100 transmits an instruction to switch the communication A to the communication B, to the communication device 180A.

In step S1412, the communication device 180A receives the instruction to switch the communication A to the communication B, from the information processing apparatus 100.

In step S1414, the communication device 180A transmits an instruction to disconnect the communication A, to the information processing apparatus 100.

In step S1416, the information processing apparatus 100 receives the instruction to disconnect the communication A, from the communication device 180A.

In step S1418, the communication device 180A disconnects the communication A with the information processing apparatus 100.

In step S1420, the information processing apparatus 100 disconnects the communication A with the communication device 180A.

In step S1422, the communication device 180A transmits an instruction to start a communication by the communication B, to the information processing apparatus 100.

In step S1424, the information processing apparatus 100 receives the instruction to start a communication by the communication B, from the communication device 180A.

In steps S1414 and S1422, the instructions are transmitted from the communication device 180A to the information processing apparatus 100. Alternatively, in reverse, the instructions may be transmitted from the information processing apparatus 100 to the communication device 180A.

In step S1426, the communication device 180A starts the communication B with the information processing apparatus 100.

In step S1428, the information processing apparatus 100 starts the communication B with the communication device 180A.

In step S1430, the information processing apparatus 100 transmits an instruction to start a communication by the communication A, to the communication device 180B.

In step S1432, the communication device 180B receives the instruction to start a communication by the communication A, from the information processing apparatus 100.

In step S1434, the communication device 180B starts the communication A with the information processing apparatus 100.

In step S1436, the information processing apparatus 100 starts the communication A with the communication device 180B.

Figure 15:
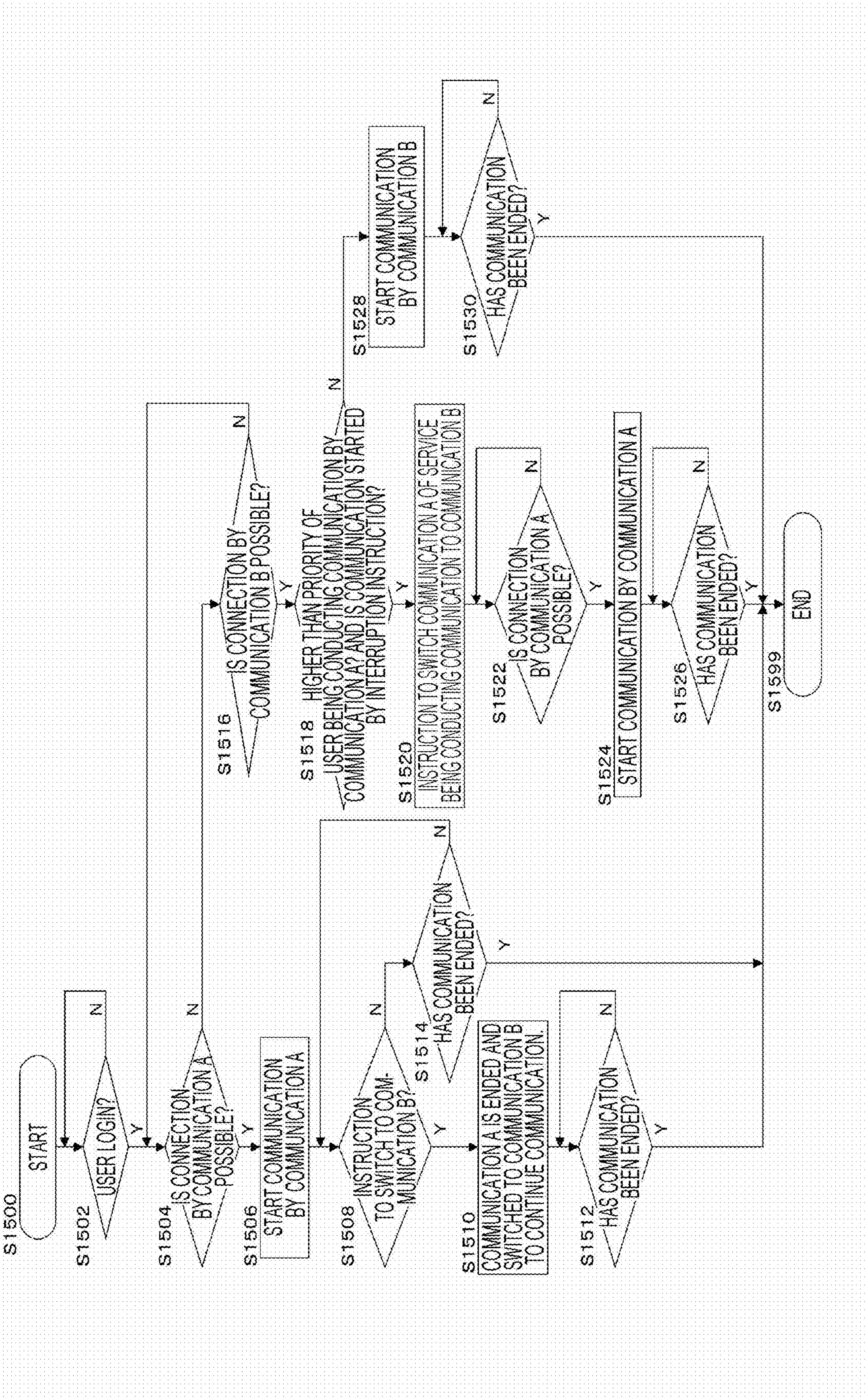
FIG. 15 is a flowchart illustrating an exemplary process according to the exemplary embodiment.

FIG. 15 is a flowchart illustrating an exemplary process according to the present exemplary embodiment.

In step S1502, it is determined whether login has been performed by a user's operation. If it is determined that the login has been performed, the process proceeds to step S1504. Otherwise, the process stands by until the login is performed.

In step S1504, it is determined whether a connection by the communication A is possible. If it is determined that the connection by the communication A is possible, the process proceeds to step S1506. Otherwise (for example, when the communication A has already been used), the process proceeds to step S1516.

In step S1506, communication is started by the communication A.

In step S1508, it is determined whether an instruction to switch the communication A to the communication B has been made. If it is determined that the instruction has been made, the process proceeds to step S1510. Otherwise, the process proceeds to step S1514.

In step S1510, the communication A is ended and switched to the communication B to continue the communication.

In step S1512, it is determined whether the communication has been ended. If it is determined that the communication has been ended, the process is ended (step S1599). Other, the process stands by until the communication is ended.

In step S1514, it is determined whether the communication has been ended. If it is determined that the communication has been ended, the process is ended (step S1599). Other, the process returns to step S1508.

In step S1516, it is determined whether a connection by the communication B is possible. If it is determined that the connection by the communication B is possible, the process proceeds to step S1518. Otherwise, the process returns to step S1504.

In step S1518, it is determined whether the priority of a user who is attempting to start a communication is higher than the priority of a user who is conducting a communication by the communication A and whether the communication, as a target communication, to be started later includes an interruption instruction. If it is determined that the conditions are met, the process proceeds to step S1520. Otherwise, the process proceeds to step S1528.

Here, the condition that "the priority of the user who is attempting to start the communication is higher than the priority of the user who is conducting the communication by the communication A" may be replaced with the condition in any of steps S718, S818, and 918 in the flowcharts illustrated in the examples of FIGS. 7 to 9.

In step S1520, an instruction is made to switch the communication A of the service that is conducting the communication to the communication B. The instruction in step S1520 corresponds to the instruction received in step S1508.

In step S1522, it is determined whether a connection by the communication A is possible. If it is determined that the connection by the communication A is possible, the process proceeds to step S1524. Otherwise, the process stands by until the connection becomes possible.

In step S1524, communication is started by the communication A.

In step S1526, it is determined whether the communication has been ended. If it is determined that the communication has been ended, the process is ended (step S1599). Other, the process stands by until the communication is ended.

In step S1528, communication is started by the communication B.

In step S1530, it is determined whether the communication has been ended. If it is determined that the communication has been ended, the process is ended (step S1599). Other, the process stands by until the communication is ended.

Figure 16:
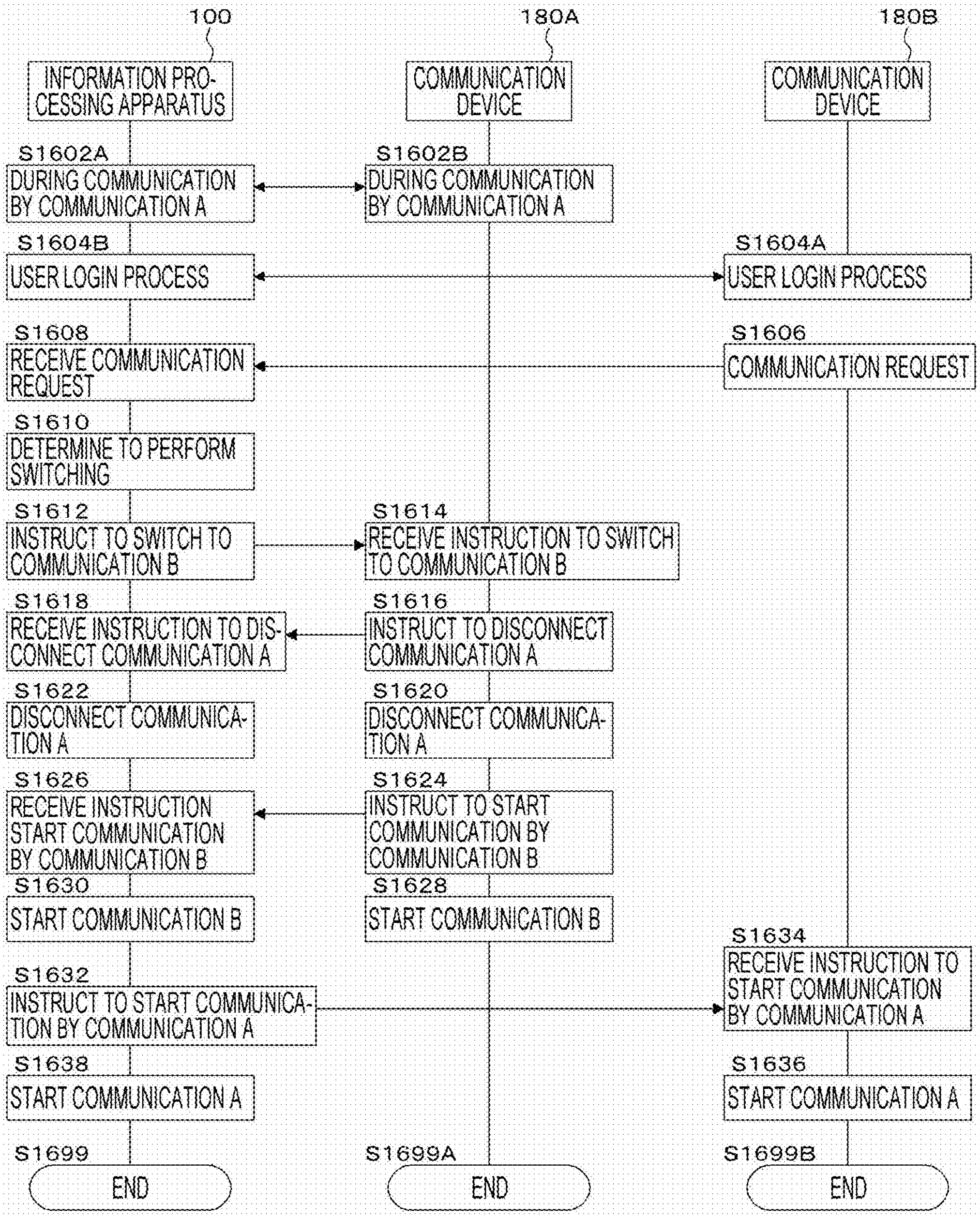
FIG. 16 is a flowchart illustrating an exemplary process according to the exemplary embodiment.

FIG. 16 is a flowchart illustrating an exemplary process according to the present exemplary embodiment. FIG. 16 illustrates an exemplary process in a case where the switching occurs in the exemplary process of the flowchart illustrated in FIG. 15. FIG. 16 represents an example where when the communication device 180A and the information processing apparatus 100 have already communicated with each other by the communication A having the fast communication speed (for example, the WiGig communication), a communication request is made from the communication device 180B, it is determined that the switching of the communication channels is necessary, the communication with the communication device 180A is switched to the communication B having the slow communication speed (for example, another Wi-Fi communication), and the communication with the communication device 180B is conducted by the communication A having the fast communication speed.

In step S1602A, the information processing apparatus 100 and the communication device 180A are communicating with each other by the communication A.

In step S1602B, the communication device 180A and the information processing apparatus 100 are communicating with each other by the communication A.

In step S1604A, a login process by a user's operation (mainly, a user's input operation) is performed in the communication device 180B.

In step S1604B, a login process by a user's operation (mainly, an authentication process) is performed in the information processing apparatus 100.

In step S1606, the communication device 180B transmits a communication request to the information processing apparatus 100. The communication request includes an "interruption instruction."

In step S1608, the information processing apparatus 100 receives the communication request from the communication device 180B.

In step S1610, the information processing apparatus 100 determines to perform the switching. Since the communication request includes the "interruption instruction," the switching process is performed.

In step S1612, the information processing apparatus 100 transmits an instruction to switch the communication A to the communication B, to the communication device 180A.

In step S1614, the communication device 180A receives the instruction to switch the communication A to the communication B, from the information processing apparatus 100.

In step S1616, the communication device 180A transmits an instruction to disconnect the communication A, to the information processing apparatus 100.

In step S1618, the information processing apparatus 100 receives the instruction to disconnect the communication A, from the communication device 180A.

In step S1620, the communication device 180A disconnects the communication A with the information processing apparatus 100.

In step S1622, the information processing apparatus 100 disconnects the communication A with the communication device 180A.

In step S1624, the communication device 180A transmits an instruction to start a communication by the communication B, to the information processing apparatus 100.

In step S1626, the information processing apparatus 100 receives the instruction to start a communication by the communication B, from the communication device 180A.

In steps S1616 and S1624, the instructions are transmitted from the communication device 180A to the information processing apparatus 100. Alternatively, in reverse, the instructions may be transmitted from the information processing apparatus 100 to the communication device 180A.

In step S1628, the communication device 180A starts the communication B with the information processing apparatus 100.

In step S1630, the information processing apparatus 100 starts the communication B with the communication device 180A.

In step S1632, the information processing apparatus 100 transmits an instruction to start a communication by the communication A, to the communication device 180B.

In step S1634, the communication device 180B receives the instruction to start a communication by the communication A, from the information processing apparatus 100.

In step S1636, the communication device 180B starts the communication A with the information processing apparatus 100.

In step S1638, the information processing apparatus 100 starts the communication A with the communication device 180B.

Figure 17:
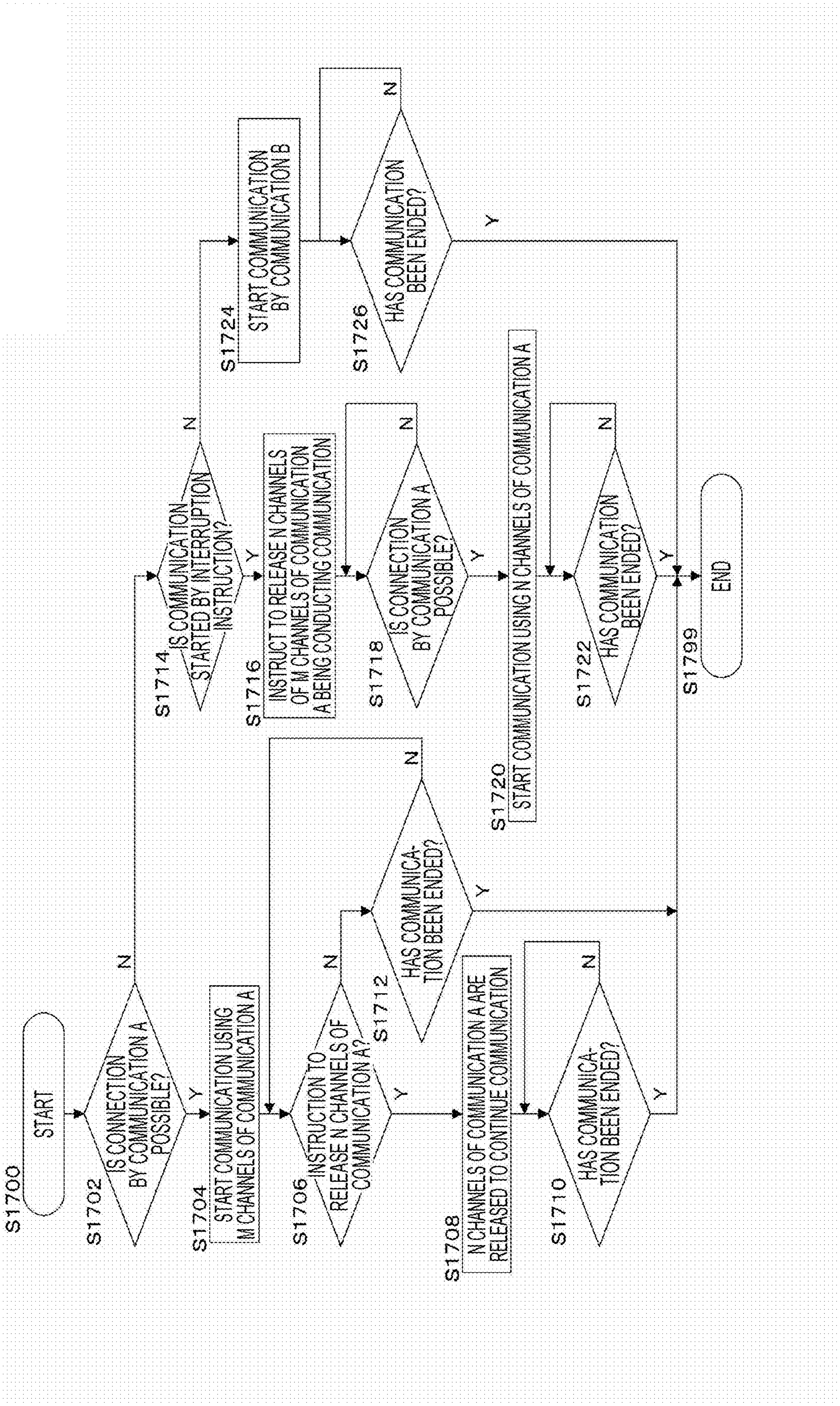
FIG. 17 is a flowchart illustrating an exemplary process according to the exemplary embodiment.

FIG. 17 is a flowchart illustrating an exemplary process according to the present exemplary embodiment.

In the flowchart of FIG. 17, M channels refer to the number of channels that may be used by the communication A at the same time (the number of channels used by the channel bonding). M channels are, for example, "four channels" when the communication A is WiGig. N channels refer to the number of channels that is smaller than the M channels. N channels are, for example, "two channels." For example, when all of the four channels of the wireless communication module 130 (WiGig) having the fast communication speed are used, the four channels are reduced by two, and the two channels are allocated to the wireless communication module 130 that is attempting to newly start a communication, so as to conduct the communication.

In step S1702, it is determined whether a connection by the communication A is possible. If it is determined that the connection by the communication A is possible, the process proceeds to step S1704. Otherwise (for example, when the communication A has already been used), the process proceeds to step S1714.

In step S1704, communication is started using the M channels of the communication A.

In step S1706, it is determined whether an instruction to release the N channels of the communication A has been made. If it is determined that the instruction has been made, the process proceeds to step S1708. Otherwise, the process proceeds to step S1712.

In step S1708, the N channels of the communication A are released to continue the communication.

In step S1710, it is determined whether the communication has been ended. If it is determined that the communication has been ended, the process is ended (step S1799). Other, the process stands by until the communication is ended.

In step S1712, it is determined whether the communication has been ended. If it is determined that the communication has been ended, the process is ended (step S1799). Other, the process returns to step S1706.

In step S1714, it is determined whether the communication, as a target communication, to be started later includes an interruption instruction. If it is determined that the communication includes an interruption instruction, the process proceeds to step S1716. Otherwise, the process proceeds to step S1724.

In step S1716, an instruction is made to release the N channels of the M channels of the communication A that is conducting the communication. The instruction in step S1718 corresponds to the instruction received in step S1706.

In step S1718, it is determined whether a connection by the communication A is possible. If it is determined that the connection by the communication A is possible, the process proceeds to step S1720. Otherwise, the process stands by until the connection becomes possible.

In step S1720, communication is started using the N channels of the communication A.

In step S1722, it is determined whether the communication has been ended. If it is determined that the communication has been ended, the process is ended (step S1799). Other, the process stands by until the communication is ended.

In step S1724, communication is started by the communication B. In this example, the communication is conducted with the communication B. Alternatively, the communication stands by until the communication A becomes free.

In step S1726, it is determined whether the communication has been ended. If it is determined that the communication has been ended, the process is ended (step S1799). Other, the process stands by until the communication is ended.

Figure 18:
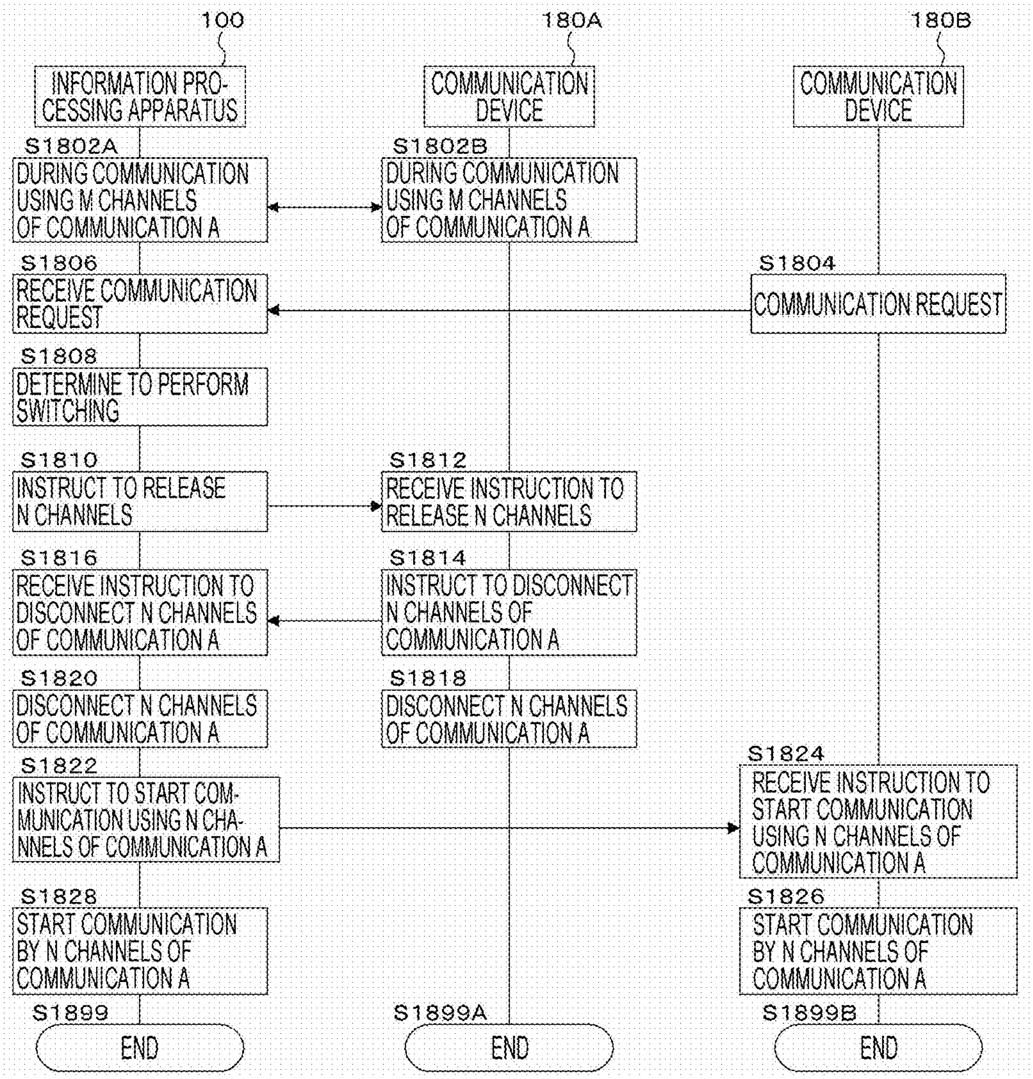
FIG. 18 is a flowchart illustrating an exemplary process according to the exemplary embodiment.

FIG. 18 is a flowchart illustrating an exemplary process according to the present exemplary embodiment. FIG. 18 illustrates an exemplary process in a case where the switching of the number of the channels occurs in the exemplary process of the flowchart illustrated in FIG. 17. FIG. 18 represents an example where when the communication device 180A and the information processing apparatus 100 have already communicated with each other by using the M channels of the communication A having the fast communication speed (for example, the WiGig communication), a communication request is made from the communication device 180B, it is determined that the switching of the communication channels is necessary, the communication with the communication device 180A is switched to a communication by (M-N) channels, and the communication with the communication device 180B is conducted by using the N channels of the communication A.

In step S1802A, the information processing apparatus 100 and the communication device 180A are communicating with each other using the M channels of the communication A.

In step S1802B, the communication device 180A and the information processing apparatus 100 are communicating with each other using the M channels of the communication A.

In step S1804, the communication device 180B transmits a communication request to the information processing apparatus 100. The communication request includes an “interruption instruction.”

In step S1806, the information processing apparatus 100 receives the communication request from the communication device 180B.

In step S1808, the information processing apparatus 100 determines to switch the channels. Since the communication request includes the “interruption instruction,” the switching process is performed.

In step S1810, the information processing apparatus 100 transmits an instruction to release the N channels, to the communication device 180A.

In step S1812, the communication device 180A receives the instruction to release the N channels, from the information processing apparatus 100.

In step S1814, the communication device 180A transmits an instruction to disconnect the N channels of the communication, to the information processing apparatus 100.

In step S1814, the instruction is transmitted from the communication device 180A to the information processing apparatus 100. Alternatively, in reverse, the instruction may be transmitted from the information processing apparatus 100 to the communication device 180A.

In step S1816, the information processing apparatus 100 receives the instruction to disconnect the N channels of the communication, from the communication device 180A.

In step S1818, the communication device 180A disconnects the N channels of the communication with the information processing apparatus 100.

In step S1820, the information processing apparatus 100 disconnects the N channels of the communication with the communication device 180A.

In step S1822, the information processing apparatus 100 transmits an instruction to start a communication using the N channels of the communication A, to the communication device 180B.

In step S1824, the communication device 180B receives the instruction to start a communication using the N channels of the communication A, from the information processing apparatus 100.

In step S1826, the communication device 180B starts a communication with the information processing apparatus 100 by the N channels of the communication A.

In step S1828, the information processing apparatus 100 starts a communication with the communication device 180B by the N channels of the communication A.

Figure 19:
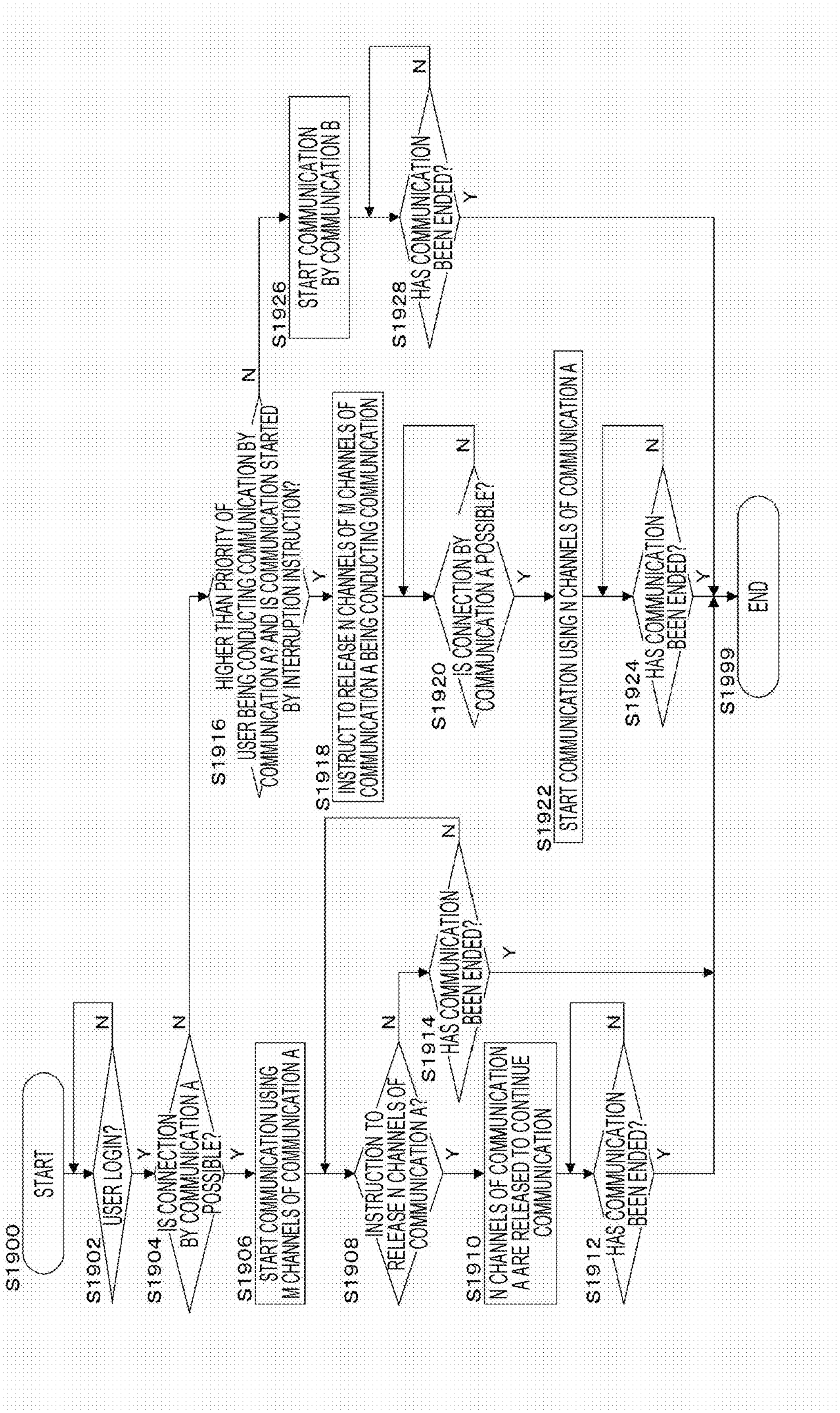
FIG. 19 is a flowchart illustrating an exemplary process according to the exemplary embodiment.

FIG. 19 is a flowchart illustrating an exemplary process according to the present exemplary embodiment.

In the flowchart of FIG. 19, M channels refer to the number of channels that may be used by the communication A at the same time (the number of channels used by the channel bonding). M channels are, for example, “four channels” when the communication A is WiGig. N channels refer to the number of channels that is smaller than the M channels. N channels are, for example, “two channels.” For example, when all of the four channels of the wireless communication module 130 (WiGig) having the fast communication speed are used, the four channels are reduced by two, and the two channels are allocated to the wireless communication module 130 that is attempting to newly start a communication, so as to conduct the communication.

In step S1902, it is determined whether login has been performed by a user’s operation. If it is determined that the login has been performed, the process proceeds to step S1904. Otherwise, the process stands by until the login is performed.

In step S1904, it is determined whether a connection by the communication A is possible. If it is determined that the connection by the communication A is possible, the process proceeds to step S1906. Otherwise (for example, when the communication A has already been used), the process proceeds to step S1916.

In step S1906, communication is started using the M channels of the communication A.

In step S1908, it is determined whether an instruction to release the N channels of the communication A has been made. If it is determined that the instruction has been made, the process proceeds to step S1910. Otherwise, the process proceeds to step S1914.

In step S1910, the N channels of the communication A are released to continue the communication.

In step S1912, it is determined whether the communication has been ended. If it is determined that the communication has been ended, the process is ended (step S1999). Other, the process stands by until the communication is ended.

In step S1914, it is determined whether the communication has been ended. If it is determined that the communication has been ended, the process is ended (step S1999). Other, the process returns to step S1908.

In step S1916, it is determined whether the priority of a user who is attempting to start a communication is higher than the priority of a user who is conducting a communication by the communication A and whether the communication, as a target communication, to be started later includes an interruption instruction. If it is determined that the conditions are met, the process proceeds to step S1918. Otherwise, the process proceeds to step S1926.

Here, the condition that "the priority of the user who is attempting to start the communication is higher than the priority of the user who is conducting the communication by the communication A" may be replaced with the condition in any of steps S718, S818, and 918 in the flowcharts illustrated in the examples of FIGS. 7 to 9.

In step S1918, an instruction is made to release the N channels of the M channels of the communication A that is conducting the communication. The instruction in step S1918 corresponds to the instruction received in step S1908.

In step S1920, it is determined whether a connection by the communication A is possible. If it is determined that the connection by the communication A is possible, the process proceeds to step S1922. Otherwise, the process stands by until the connection becomes possible.

In step S1922, a communication is started using the N channels of the communication A.

In step S1924, it is determined whether the communication has been ended. If it is determined that the communication has been ended, the process is ended (step S1999). Other, the process stands by until the communication is ended.

In step S1926, communication is started by the communication B. In this example, the communication is conducted with the communication B. Alternatively, the communication stands by until the communication A becomes free.

In step S1928, it is determined whether the communication has been ended. If it is determined that the communication has been ended, the process is ended (step S1999). Other, the process stands by until the communication is ended.

Figure 20:
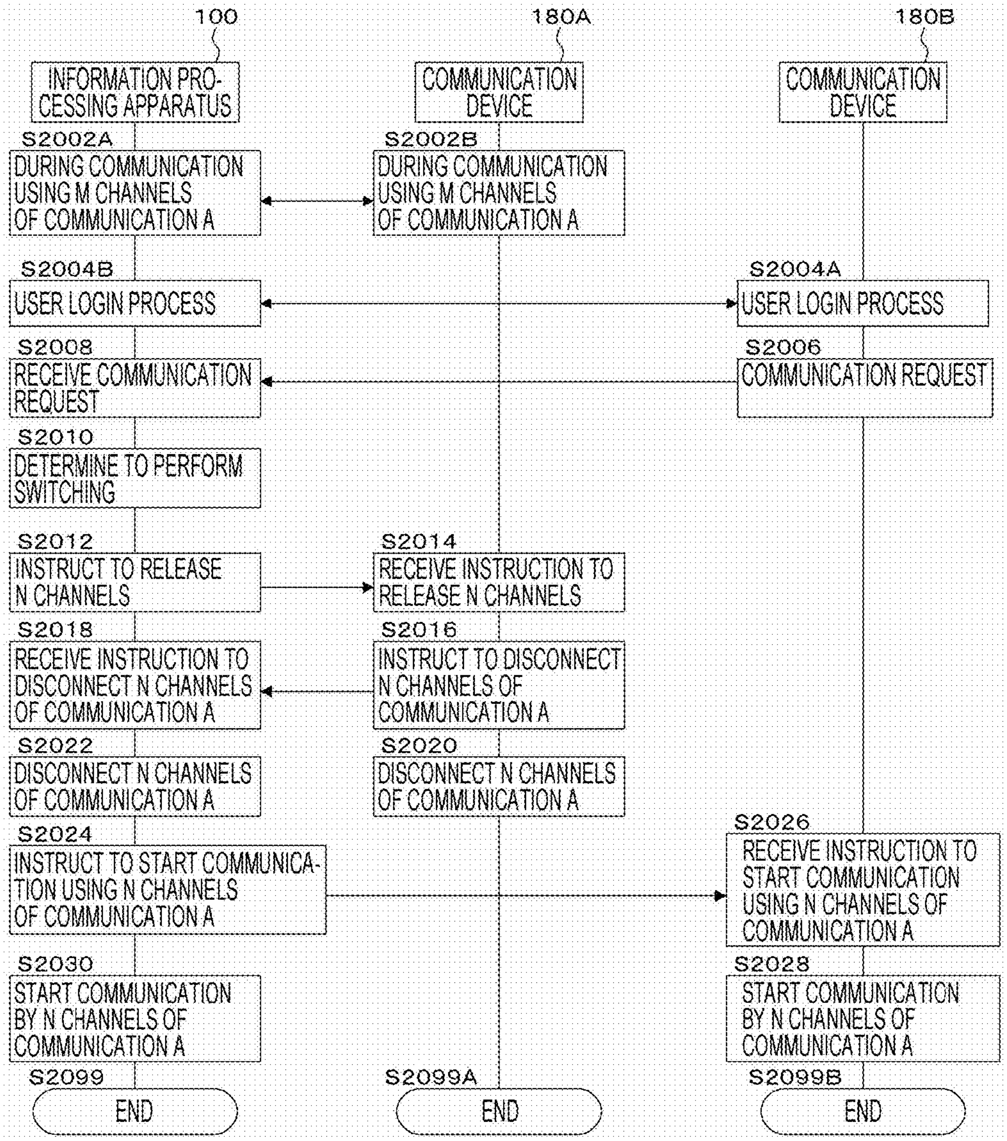
FIG. 20 is a flowchart illustrating an exemplary process according to the exemplary embodiment.

FIG. 20 is a flowchart illustrating an exemplary process according to the present exemplary embodiment. FIG. 20 illustrates an exemplary process in a case where the switching of the number of the channels occurs in the exemplary process of the flowchart illustrated in FIG. 19. FIG. 20 represents an example where when the communication device 180A and the information processing apparatus 100 have already communicated with each other by using the M channels of the communication A having the fast communication speed (for example, the WiGig communication), a communication request is made from the communication device 180B, it is determined that the switching of the communication channels is necessary, the communication with the communication device 180A is switched to a communication by (M-N) channels, and the communication with the communication device 180B is conducted by using the N channels of the communication A.

In step S2002A, the information processing apparatus 100 and the communication device 180A are communicating with each other using the M channels of the communication A.

In step S2002B, the communication device 180A and the information processing apparatus 100 are communicating with each other using the M channels of the communication A.

In step S2004A, a login process by a user's operation (mainly, a user's input operation) is performed in the communication device 180B.

In step S2004B, a login process by a user's operation (mainly, an authentication process) is performed in the information processing apparatus 100.

In step S2006, the communication device 180B transmits a communication request to the information processing apparatus 100. The communication request includes an "interruption instruction."

In step S2008, the information processing apparatus 100 receives the communication request from the communication device 180B.

In step S2010, the information processing apparatus 100 determines to switch the channels. Since the communication request includes the "interruption instruction," the switching process is performed.

In step S2012, the information processing apparatus 100 transmits an instruction to release the N channels, to the communication device 180A.

In step S2014, the communication device 180A receives the instruction to release the N channels, from the information processing apparatus 100.

In step S2016, the communication device 180A transmits an instruction to disconnect the N channels of the communication, to the information processing apparatus 100.

In step S2016, the instruction is transmitted from the communication device 180A to the information processing apparatus 100. Alternatively, in reverse, the instruction may be transmitted from the information processing apparatus 100 to the communication device 180A.

In step S2018, the information processing apparatus 100 receives the instruction to disconnect the N channels of the communication, from the communication device 180A.

In step S2020, the communication device 180A disconnects the N channels of the communication with the information processing apparatus 100.

In step S2022, the information processing apparatus 100 disconnects the N channels of the communication with the communication device 180A.

In step S2024, the information processing apparatus 100 transmits an instruction to start a communication using the N channels of the communication A, to the communication device 180B.

In step S2026, the communication device 180B receives the instruction to start a communication using the N channels of the communication A, from the information processing apparatus 100.

In step S2028, the communication device 180B starts the communication with the information processing apparatus 100 by the N channels of the communication A.

In step S2030, the information processing apparatus 100 starts the communication with the communication device 180B by the N channels of the communication A.

An exemplary hardware configuration of the information processing apparatus of the present exemplary embodiment will be described with reference to FIG. 21. The configuration illustrated in FIG. 21 is configured with, for example, a personal computer (PC), and represents an exemplary hardware configuration provided with a data reading unit 2117 such as a scanner and a data output unit 2118 such as a printer.

Figure 21:
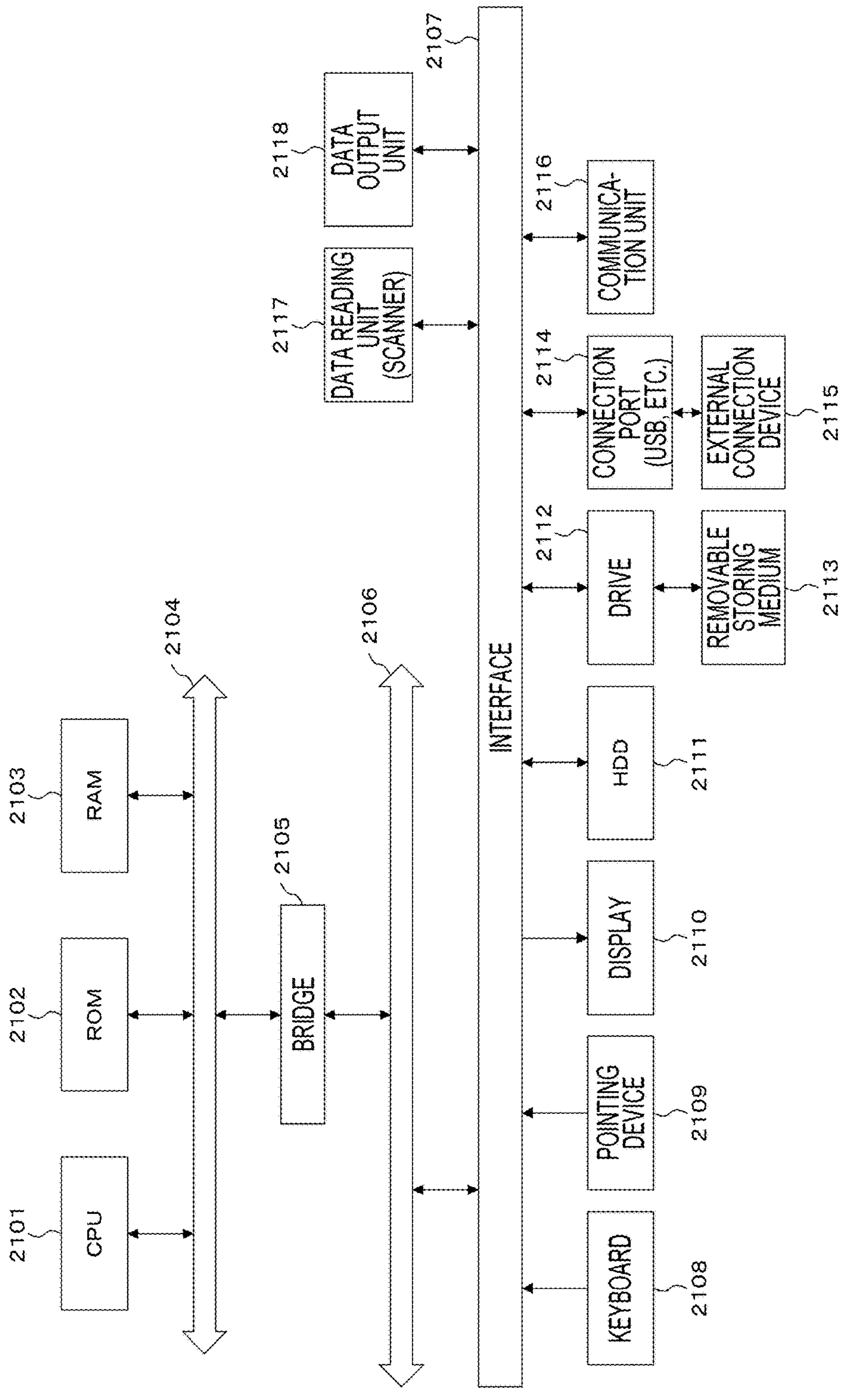
FIG. 21 is a block diagram illustrating an exemplary hardware configuration of a computer implementing the exemplary embodiment.

Further, while the example illustrated in FIG. 3 represents the configuration mainly serving as a chip using the ASIC or the like, the example illustrated in FIG. 21 mainly represents a functional configuration that is implemented by a personal computer or the like. For example, a CPU 2101 takes in charge of the functions of the SoC 300 and the ASIC 330.

A CPU 2101 is a controller that performs processes according to a computer program describing an execution sequence of each of the various modules described in the above-described exemplary embodiment, that is, the communication control module 110, the switching determination module 115, the switching module 120, the control module 125, the wireless communication A module 130A, the wireless communication B module 130B and the like.

A read only memory (ROM) 2102 stores programs, operation parameters and the like used by the CPU 2101. A RAM 2103 stores programs used in the execution by the CPU 2101, parameters appropriately varying in the execution and the like. These components are connected to each other by a host bus 2104 configured with a CPU bus or the like.

The host bus 2104 is connected to an external bus 2106 such as a peripheral component interconnect/interface (PCI) bus via a bridge 2105.

A keyboard 2108 and a pointing device 2109 such as a mouse are devices operated by an operator. A display 2110 is, for example, a liquid crystal display device or a cathode ray tube (CRT), and displays various types of information as texts and image information. In addition, a touch screen or the like having the functions of both the pointing device 2109 and the display 2110 may be used. In this case, the function of the keyboard may be implemented by drawing the keyboard using software (also called a so-called software keyboard, screen keyboard or the like) on the screen (the touch screen), without the physical connection as in the keyboard 2108.

A hard disk drive (HDD) 2111 is equipped with a hard disk (which may be a flash memory or the like) therein, drives the hard disk, and stores or plays programs or information executed by the CPU 2101. In the hard disk, the user information table 600, a priority of a predetermined service, communication contents and the like are stored. Further, in the hard disk, other various data and various computer programs are stored.

A drive 2112 reads data or programs stored in a removable storage medium 2113 such as a mounted magnetic disk, optical disc, magneto-optical disc, or semiconductor memory, and supplies the data or programs to the interface 2107, the external bus 2106, the bridge 2105, and the RAM 2103 connected via the host bus 2104. In addition, the removable storage medium 2113 may also be used as a data storing area.

A connection port 2114 is a port for connection of an external connection device 2115, and includes connection units such as USB and IEEE 1394. The connection port 2114 is connected to the CPU 2101 and the like via the interface 2107, the external bus 2106, the bridge 2105, the host bus 2104 and the like. A communication unit 2116 is connected to a communication line and performs a process of a data communication with an external device. A data reading unit 2117 is, for example, a scanner and performs a document reading process. A data output unit 2118 is, for example, a printer and performs a document data outputting process.

The hardware configuration of the information processing apparatus illustrated in FIG. 21 represents an exemplary configuration. The present exemplary embodiment is not limited to the configuration illustrated in FIG. 21, and may be any configuration that may execute the modules described in the present exemplary embodiment. For example, some of the modules may be configured with dedicated hardware (for example, application specific integrated circuit (ASIC)), and some of the modules may be in the form in which the modules are present in an external system and connected via a communication line. Further, the multiple systems illustrated in FIG. 21 may be connected to each other via a communication line and cooperate with each other. In addition, the multiple systems of FIG. 21 may be incorporated in a personal computer, a portable information communication device, an information appliance, a robot, a copier, a facsimile, a scanner, a printer, a multifunction machine and the like (an image processing apparatus having two or more functions of a scanner, a printer, a copying machine, a facsimile and the like).

In the comparing process described in the above-described exemplary embodiment, the expressions "equal to or more than," "equal to or less than," "larger than," and "smaller than (not exceeding)" may be replaced with "larger than," "smaller than (not exceeding)," "equal to or more than," and "equal to or less than," respectively unless the replacement causes contradiction.

In addition, the communication device 180 may include the information processing apparatus 100. For example, an image processing apparatus having no information processing apparatus 100 and the communication device 180 having the information processing apparatus 100 may communicate with each other. Alternatively, the image processing apparatus 200 having the information processing apparatus 100 and the communication device 180 having the information processing apparatus 100 may communicate with each other.

The above-described programs may be provided in the form of being stored in a storage medium or provided by a communication unit. In this case, for example, the above-described programs may be construed as an invention of a "computer readable storage medium storing a program."

The "computer readable storage medium storing a program" refers to a computer readable storage medium storing a program, which is used for installation, execution, distribution, and the like of a program.

The storage medium includes, for example, a digital versatile disc (DVD) such as "DVD-R, DVD-RW, DVD-RAM or the like" which is the standard formulated in the DVD forum, "DVD+R, DVD+RW or the like" which is the standard formulated in DVD+RW, a compact disc (CD) such as a CD read only memory (CD-ROM), a CD recordable (CD-R), or a CD rewritable (CD-RW), a Blu-ray disc (Blu-ray (registered trademark) disc), a magneto-optical (MO) disc, a flexible disk (FD), a magnetic tape, a hard disk, a ROM, an electrically erasable and rewritable read only memory (EEPROM (registered trademark)), a flash memory, a random access memory (RAM), and a secure digital (SD) memory card.

All or some of the above-described programs may be stored in the storage medium so as to be saved or distributed. Further, the programs may be transmitted using a transmission medium such as a wired network used in a local area network (LAN), a metropolitan area network (MAN), a wide area network (WAN), the Internet, the Intranet, the Extranet, and the like, a wireless communication network, or a combination thereof, or may be carried on carrier waves.

In addition, the above-described programs may be all or parts of other programs, or may be stored together with separate programs in the storage medium. In addition, the above-described programs may be divided and stored in multiple storage media. In addition, the above-described programs may be stored in a compressed or encrypted form as long as the programs may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a plurality of wireless communication units configured to conduct wireless communication at different wireless communication speeds from each other;

a switching unit, wherein if a wireless communication with a first user is attempted to be started, the switching unit compares a priority of a second user who is conducting a wireless communication with a priority of the second user who is attempting to start the wireless communication, to switch a communication unit so that whichever of the first and second users has a higher priority uses a communication unit having a faster wireless communication speed; and a controller configured to perform a control to start the wireless communication using the wireless communication unit switched by the switching unit.

2. The information processing apparatus according to claim 1, wherein each of the wireless communication units includes a plurality of channels, and if a service that is conducting wireless communication uses the plurality of channels, the switching unit performs the switching by reducing the number of channels and allocating the reduced channels to a service that is attempting to start a wireless communication.

3. The information processing apparatus according to claim 1, wherein if an interruption instruction to interrupt a wireless communication that is being conducted is additionally made, the switching unit compares the priorities of the users to switch the wireless communication unit.

4. The information processing apparatus according to claim 2, wherein if an interruption instruction to interrupt a wireless communication that is being conducted is additionally made, the switching unit compares the priorities of the users to switch the wireless communication unit.

5. A non-transitory computer readable storage medium storing an information processing program that causes a computer to function as:

a plurality of wireless communication units configured to conduct a wireless communication at different wireless communication speeds from each other;

a switching unit, wherein if a wireless communication with a first user is attempted to be started, the switching unit compares a priority of a second user who is conducting a wireless communication with a priority of the second user who is attempting to start the wireless communication, to switch a wireless communication unit so that whichever of the first and second users has a higher priority uses a wireless communication unit having a faster wireless communication speed; and a controller configured to perform a control to start the wireless communication using the wireless communication unit switched by the switching unit.

6. An information processing apparatus comprising:

a plurality of wireless communication means for conducting a wireless communication at different wireless communication speeds from each other;

switching means, wherein if a wireless communication with a first user is attempted to be started, the switching means compares a priority of a second user who is conducting a wireless communication with a priority of the second user who is attempting to start the wireless communication, to switch wireless communication means so that whichever of the first and second users has a higher priority uses wireless communication means having a faster wireless communication speed; and control means for performing a control to start the wireless communication using the wireless communication means switched by the switching means.

* * * * *